US012775519B2

(12) United States Patent
Horley et al.

(10) Patent No.: US 12,775,519 B2
(45) Date of Patent: Oct. 27, 2026

(54) STACK POINTER SWITCH VALIDITY CHECKING

(71) Applicant: Arm Limited, Cambridge (GB)

(72) Inventors: John Michael Horley, Hauxton (GB); Simon John Craske, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 19/123,339

(22) PCT Filed: Sep. 20, 2023

(86) PCT No.: PCT/GB2023/052441
§ 371 (c)(1),
(2) Date: Apr. 22, 2025

(87) PCT Pub. No.: WO2024/089383
PCT Pub. Date: May 2, 2024

(65) Prior Publication Data

US 2026/0147668 A1 May 28, 2026

(30) Foreign Application Priority Data

Oct. 27, 2022 (GB) ..................................... 2215944

(51) Int. Cl.
*G06F 11/10* (2006.01)
*G06F 12/10* (2016.01)

(52) U.S. Cl.
CPC .......... *G06F 11/1016* (2013.01); *G06F 12/10* (2013.01); *G06F 2212/1008* (2013.01)

(58) Field of Classification Search
CPC ............................ G06F 11/1016; G06F 12/10
See application file for complete search history.

(56) References Cited

U.S. PATENT DOCUMENTS 10,394,556 B2 * 8/2019 Shanbhogue ........... G06F 9/461
11,468,168 B1 10/2022 Blasco et al.
(Continued)

FOREIGN PATENT DOCUMENTS

GB 2577947 A 4/2020

OTHER PUBLICATIONS

International Search report and the written opinion for International Application No. PCT/GB2023/052441, dated Dec. 15, 2023.
(Continued)

*Primary Examiner* — Jigar P Patel
(74) *Attorney, Agent, or Firm* — NIXON & VANDERHYE P.C.

(57) ABSTRACT

Processing circuitry 16 performs a stack pointer switch validity checking operation associated with a switch of the stack pointer from an outgoing stack pointer value to an incoming stack pointer value. The validity checking operation comprises verifying whether an incoming data value obtained by memory access circuitry 26 in response to a memory access request specifying an address determined based on the incoming stack pointer value meets at least one stack cap value validity condition, including a condition that a predetermined portion of the incoming data value corresponds to a given page address indicative of a page of address space comprising the address determined based on the incoming stack pointer value. The at least one stack cap value validity condition is determined independent of whether a further portion of the incoming data value other than the predetermined portion corresponds to sub-page address bits of the address determined based on the incoming stack pointer value. An error handling response is triggered in response to determining that the incoming data value fails to meet the at least one stack cap value validity condition.

21 Claims, 11 Drawing Sheets

(56) References Cited

U.S. PATENT DOCUMENTS

| | | | | |
|---|---|---|---|---|
| 11,561,904 | B2 * | 1/2023 | Wallach | G06F 12/1009 |
| 11,656,805 | B2 * | 5/2023 | Shanbhogue | G06F 12/0811<br>726/23 |
| 2016/0021134 | A1 | 1/2016 | Li et al. | |
| 2021/0224380 | A1 | 7/2021 | Grocutt | |

OTHER PUBLICATIONS

International Search Report for GB2215944.6, dated Apr. 26, 2026.

Bedichek, "Some Efficient Architecture Simulation Techniques," Department of Computer Science, FR-35 University of Washington, Seattle, Washington 98195.

"Intel® 64 and IA-32 Architectures Software Developer's Manual," Apr. 2022.

Office Action for IN Application No. 202517039645 dated May 29, 2026, 9 pages.

* cited by examiner

STACK POINTER SWITCH VALIDITY CHECKING

The present technique relates to the field of data processing.

A stack pointer may be used to manage access to a stack data structure in memory. A stack data structure is a data structure for which access to entries on the stack is managed according to a last in first out (LIFO) policy. The stack pointer provides an address relative to which addresses of items on the stack can be determined. As items are pushed to the stack and popped from the stack, the stack pointer is updated to track the location representing the "top" of the stack.

At least some examples provide an apparatus comprising: memory access circuitry to perform a stack access to a stack data structure based on a stack pointer; and processing circuitry to perform a stack pointer switch validity checking operation associated with a switch of the stack pointer from an outgoing stack pointer value to an incoming stack pointer value, the stack pointer switch validity checking operation comprising verifying whether an incoming data value obtained by the memory access circuitry in response to a memory access request specifying an address determined based on the incoming stack pointer value meets at least one stack cap value validity condition, the at least one stack cap value validity condition including a condition that a predetermined portion of the incoming data value corresponds to a given page address indicative of a page of address space comprising the address determined based on the incoming stack pointer value, in which: the processing circuitry is configured to determine whether the incoming data value meets the at least one stack cap value validity condition, independent of whether a further portion of the incoming data value other than the predetermined portion corresponds to sub-page address bits of the address determined based on the incoming stack pointer value; and the processing circuitry is configured to trigger an error handling response in response to determining that the incoming data value fails to meet the at least one stack cap value validity condition.

At least some examples provide a method comprising: performing a stack pointer switch validity checking operation associated with a switch of a stack pointer from an outgoing stack pointer value to an incoming stack pointer value, the stack pointer switch validity checking operation comprising verifying whether an incoming data value obtained by memory access circuitry in response to a memory access request specifying an address determined based on the incoming stack pointer value meets at least one stack cap value validity condition, the at least one stack cap value validity condition including a condition that a predetermined portion of the incoming data value corresponds to a given page address indicative of a page of address space comprising the address determined based on the incoming stack pointer value, in which: whether the incoming data value meets the at least one stack cap value validity condition is determined independent of whether a further portion of the incoming data value other than the predetermined portion corresponds to sub-page address bits of the address determined based on the incoming stack pointer value; and the method comprises triggering an error handling response in response to determining that the incoming data value fails to meet the at least one stack cap value validity condition.

At least some examples provide a computer program comprising instructions which, when executed by a host data processing apparatus, control the host data processing apparatus to provide an instruction execution environment for executing target code, the computer program comprising: memory access program logic to perform a stack access to a stack data structure based on a stack pointer; and processing program logic to perform a stack pointer switch validity checking operation associated with a switch of the stack pointer from an outgoing stack pointer value to an incoming stack pointer value, the stack pointer switch validity checking operation comprising verifying whether an incoming data value obtained by the memory access program logic in response to a request specifying an address determined based on the incoming stack pointer value meets at least one stack cap value validity condition, the at least one stack cap value validity condition including a condition that a predetermined portion of the incoming data value corresponds to a given page address indicative of a page of address space comprising the address determined based on the incoming stack pointer value, in which: the processing program logic is configured to determine whether the incoming data value meets the at least one stack cap value validity condition, independent of whether a further portion of the incoming data value other than the predetermined portion corresponds to sub-page address bits of the address determined based on the incoming stack pointer value; and the processing program logic is configured to trigger an error handling response in response to determining that the incoming data value fails to meet the at least one stack cap value validity condition.

Further aspects, features and advantages of the present technique will be apparent from the following description of examples, which is to be read in conjunction with the accompanying drawings, in which.

Figure 1:
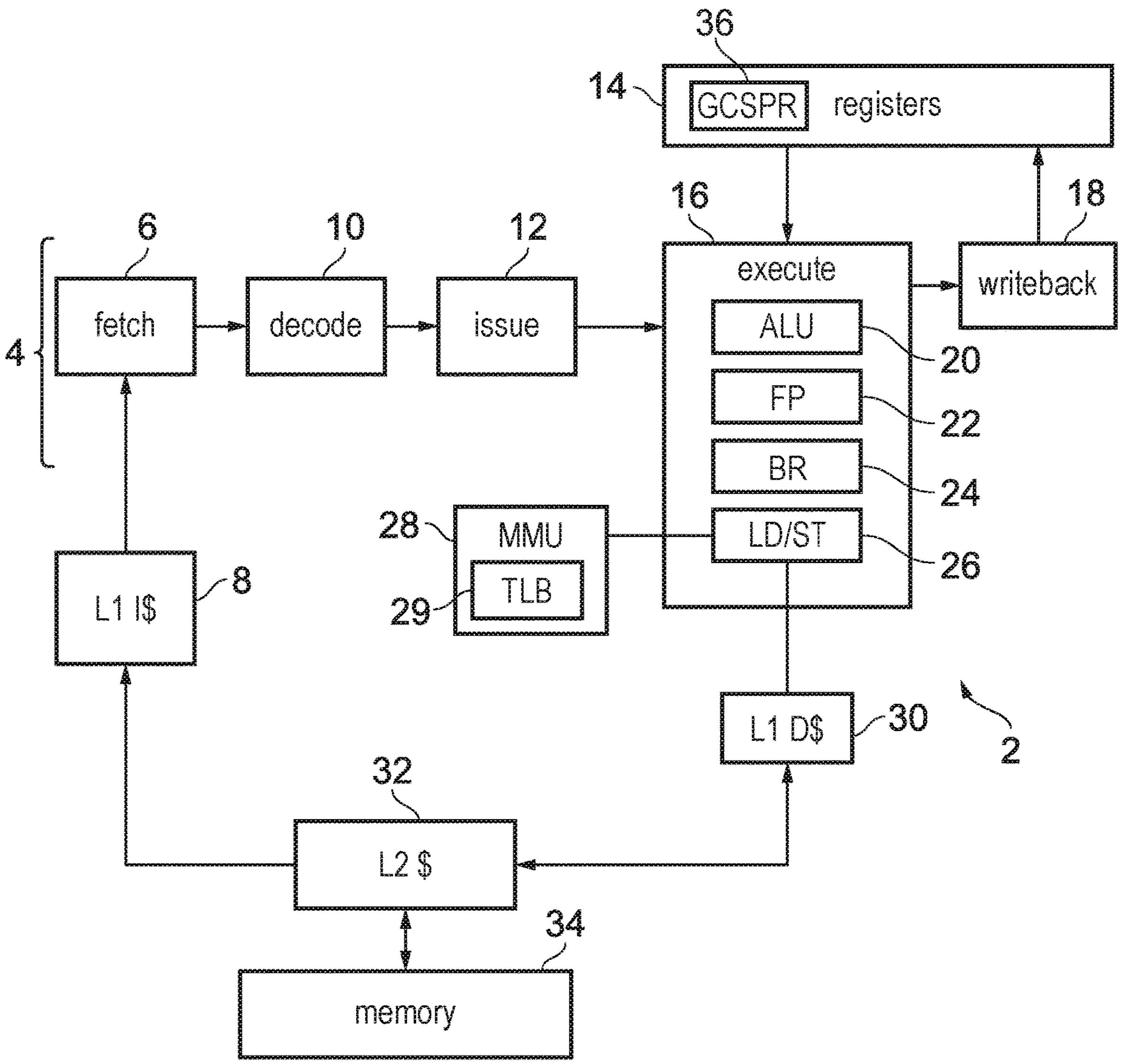
FIG. 1 illustrates an example of a data processing apparatus.

An apparatus comprises memory access circuitry to perform a stack access to a stack data structure based on a stack pointer. Different portions of software may be associated with different stack structures in memory, so when switching between those portions of software, it may be desired to switch a corresponding stack pointer from an outgoing stack pointer value associated with the outgoing software to an incoming stack pointer value associated with the incoming software. However, for some stacks, it may be important that the stack pointer cannot be switched to an arbitrary location not intended to be an incoming stack structure. For example, some stacks may be associated with certain security measures when pushing items onto the stack and popping items from the stack. If the stack pointer could be switched to an arbitrary software-chosen address, this could circumvent those security measures as it could lead to future stack accesses accessing data that has not been protected by those measures.

Therefore, it may be desirable to provide a technique for policing switches of stack pointer. One approach can be to trap updates to the stack pointer to a more privileged execution state, so that more privileged software can examine the incoming stack pointer value and determine whether the update can be allowed. However, it may be desirable to support fast software thread switching without requiring a call to a kernel or other more privileged software. Such thread switches may occur frequently and so the performance overhead of calling to the kernel on every switch of stack pointer may be considered too high.

In the examples discussed below, processing circuitry supports performing a stack pointer switch validity checking operation associated with a switch of the stack pointer from an outgoing stack pointer value to an incoming stack pointer value. The stack pointer switch validity checking operation comprising verifying whether an incoming data value obtained by the memory access circuitry in response to a memory access request specifying an address determined based on the incoming stack pointer value meets at least one stack cap value validity condition. The at least one stack cap value validity condition includes a condition that a predetermined portion of the incoming data value corresponds to a given page address indicative of a page of address space comprising the address determined based on the incoming stack pointer value. The processing circuitry determines whether the incoming data value meets the at least one stack cap value validity condition, independent of whether a further portion of the incoming data value other than the predetermined portion corresponds to sub-page address bits of the address determined based on the incoming stack pointer value. An error handling response is triggered in response to determining that the incoming data value fails to meet the at least one stack cap value validity condition.

Hence, an incoming data value is obtained by the memory access circuitry from a location having a memory address determined based on the incoming stack pointer value. For example, the incoming data value could be obtained from the location that should represent the top of the stack if the incoming stack pointer value does represent a previously established stack structure. To pass the validity check, the incoming data value is required to specify, in a predetermined portion, a given page address that indicates a page of address space comprising the address of the location providing the incoming data value itself. Hence, software is required to ensure that an inactive stack has, at a location relative to the incoming stack pointer which would later be used to reference the stack, a stack cap value that specifies the page address of the page in the address space storing that value. This provides a security measure for filtering out some erroneous operations which provide the wrong value for the incoming stack pointer value (that does not correspond to the intended stack structure to be switched to), since it is relatively improbable that a location represented by the erroneous incoming stack pointer value would happen to contain a data value specifying the page address of that location itself.

One might think that security could be tightened further by requiring that the incoming data value, to be valid, should specify the specific address of the location providing that value, including sub-page address bits which distinguish different addresses in the same page. This could further tighten security because a pointer to the very same address of the location storing the pointer itself would be extremely rare so the probability of accidentally passing the stack pointer switch validity checking operation when specifying a random other address as the incoming stack pointer value would be extremely low.

However, the inventors recognised that, in practice, for security it can be sufficient to indicate the page address in the stack cap value that is used to identify a stack structure that can validly be switched to. By determining whether the at least one stack cap value validity condition is satisfied by the incoming data value, regardless of whether any portion of the incoming data value corresponds to the sub-page address bits of the address determined from the incoming stack pointer value, this frees up bits of the data word providing the stack cap value for other purposes. This can be particularly useful because for some use cases, it may be desirable to support a number of different stack record types which can be allocated onto the stack. If the sub-page address bits are required to be meaningful when checking validity of a stack cap value, then aside from a handful of lower bits of the address which might not be needed to be specified explicitly given any data/instruction address alignment restrictions, the majority of bits of the data word would be needed to specify the address in the stack cap value, leaving very few bits available for encoding a stack record type. In contrast, by requiring that a valid stack cap value specifies the page address of the location storing the stack cap value, but not requiring that sub-page address bits are specified, this frees up a greater number of bits for encoding stack record types, which can be extremely useful for supporting future expansions to a processor architecture.

The given page address may be a virtual page address indicative of a page of virtual address space comprising a virtual address determined based on the incoming stack pointer value. By requiring that, to be valid on a switch of stack pointer, the incoming data value (obtained by the memory access circuitry based on the incoming stack pointer value) provides the virtual page address of the location that stores that incoming data value, this also provides a sanity check that the incoming stack is being accessed with the same virtual-to-physical address translation mapping that was used when the stack was previously accessed, which can help detect attacks based on an attacker defining an aliasing virtual-to-physical address translation mapping which maps a different virtual address onto the physical address of the location storing the stack.

The processing circuitry may support performing an outgoing stack capping operation associated with the switch of the stack pointer from the outgoing stack pointer value to the incoming stack pointer value, to push a valid stack cap value to a location having an address selected based on the outgoing stack pointer value, the valid stack cap value specifying, in the predetermined portion of the valid stack cap value, a page address indicative of a page of address space comprising the address selected based on the outgoing stack pointer value. The outgoing stack capping operation is complementary to the stack pointer switch validity checking operation, in that it sets up the valid stack cap value on the outgoing stack, which would be expected to pass the stack pointer switch validity checking operation when that stack is later switched back in as the incoming stack in a later stack switching operation.

It is not essential for the outgoing stack capping operation to be conditional on the incoming data value meeting the at least one stack cap value validity condition in the stack pointer switch validity checking operation. Even if the incoming stack pointer is erroneous causing the incoming data value loaded based on the incoming stack pointer value to fail the check for the stack pointer switch validity checking operation, it may still be safe to cap the outgoing stack using a valid stack cap value. In any case, as described below, in some implementations the outgoing stack capping operation may be triggered by a different instruction to the stack pointer switch validity checking operation, so the circuit logic implementing the function of the instruction for triggering the outgoing stack capping operation may be defined independent of any validity check and may simply carry out the outgoing stack capping operation. Even if an error is detected in response to the instruction triggering the stack pointer switch validity checking operation, this may not necessarily stop the instruction for triggering the outgoing stack capping operation from being executed (the timing of responding to the error identified in the stack pointer switch validity checking operation can vary and May not require a fault to be signalled immediately, as explained further below).

The page address specified in the valid stack cap value for the outgoing stack capping operation may be a virtual page address indicative of a page of virtual address space comprising a virtual address selected based on the outgoing stack pointer value.

The technique described above can be used for any use case where a stack data structure is used by the processing circuitry to maintain thread-specific data, where different software threads may be allocated different stack data structures so that it may be desired on a thread switch to switch the stack pointer from an outgoing stack pointer to an incoming stack pointer to change which stack is active. The technique can be particularly useful for use cases where the data on the stack is sensitive or otherwise requires certain security measures governing use of the data on the stack, so that there is a risk, on a stack pointer switch, that switching to an arbitrary address in memory not representing a stack that has undergone those security measures could risk erroneous results which may compromise the software code being executed.

However, one particular scenario in which the technique can be useful is where the stack pointer is a guarded control stack (GCS) pointer for controlling access to a guarded control stack (GCS) data structure for protecting return addresses for returning from an exception or function call. Such a GCS data structure can be used as a defence measure against return oriented programming (ROP) attacks, which are a common form of attack which aims to cause incorrect control flow by changing the return address used on a function return or exception return (typically by changing the return address while it is stored in memory during a nested sequence of function calls or exceptions). A protected GCS data structure may be established in a region of memory which has at least one defence measure restricting the ability to write data in the GCS data structure, providing some additional protection relative to normal memory regions, making it less likely that an attacker can cause instructions not expected to write to the GCS data structure to change the return state saved on the GCS data structure. The protected return state information from the GCS data structure can either be used to control the exception/function return directly, or compared with exception/function return information obtained by software from other sources (e.g. a separate software-managed stack structure in memory) to check whether that exception/function return information is safe to use, before triggering the corresponding exception/function return. However, while certain security measures may be available to prevent erroneous updates to the GCS data structure, those measures may be ineffective if an attacker could easily circumvent them by switching the stack pointer used to access the GCS data structure to an incoming stack pointer value that points to a region of memory controlled by the attacker, so that the wrong return state is then returned when the victim software subsequently tries to access the GCS data structure. Also, some attacks could be based on switching the incoming stack pointer to the correct GCS data structure, but to the wrong location on that GCS data structure, such as a location not representing the current "top" of the stack, which could risk later exception/function returns behaving incorrectly because they use the return state intended for a different exception/function return.

Hence, the stack pointer switch validity checking operation can be particularly useful for use in an architecture supporting the use of a GCS data structure, as it enables a sanity check of whether the incoming GCS data structure is safe to use without requiring each stack pointer switch to be trapped to a higher privilege level. Also, the more efficient encoding of the stack cap value using the page address rather than a full address is useful because it frees up a large number of stack record encodings for other purposes. As the GCS data structure can be used to protect data against tampering by attackers, providing encoding space for additional types of stack record can be useful to allow other types of information to be protected using the GCS data structure (not just function/exception return state information).

A number of security measures may be supported in the instruction set architecture used by the processing circuitry, to protect the GCS data structure against tampering. The apparatus may have memory management circuitry to determine whether access to a target address is allowed based on memory attribute data associated with the target address, the memory attribute data specifying whether a target memory address space region including the target address is a GCS region for storing the GCS data structure, where write access to the GCS region is restricted to a dedicated class of GCS accessing instructions. Hence, the GCS data structure may be allocated in a dedicated type of memory region (treated by the memory management circuitry as a distinct type of memory different to normal memory used for general purpose data or program code). By limiting the class of instructions which can write to such a GCS region of memory, this reduces the attack surface available for attackers to exploit in trying to modify return state saved on the GCS data structure.

The memory management circuitry may reject a non-GCS store operation to the target address triggered by a store instruction other than the dedicated class of GCS accessing instructions, in response to determining that the target memory address space region is the GCS region. By restricting the ability to write to the GCS region to certain GCS-accessing types of store operation, other more general store instructions cannot tamper with the contents of the GCS data structure, providing a greater security guarantee for the protected return state information stored in the GCS data structure. This reduces the attack surface available for attackers to exploit when trying to mount ROP attacks.

Similarly, the memory management circuitry may reject a GCS load/store operation to the target address triggered by one of the dedicated class of GCS accessing instructions, in response to determining that the target memory address space region is not the GCS region. Hence, accesses to a memory region not designated as being for the GCS data structure may be rejected if the access is triggered by a GCS-accessing type of instruction. This avoids GCS-accessing types of instructions being misused to access regions of memory not intended for storing the GCS data structure, and gives confidence that a GCS read will be to a memory region which cannot have been modified by non-GCS-accessing instructions, to defend against ROP attacks. The load of incoming data value for the stack pointer switch validity checking operation may be considered a GCS load operation so that it fails if the address is identified by the memory attribute data as corresponding to a memory region type other than GCS region type.

In some examples, the memory management circuitry may also reject an instruction fetch or branch to the target address when the memory attribute data specifies that the target memory address space region is the GCS region. Hence, data stored in a GCS region cannot be treated as an executable instruction (although it can be treated as an address pointer which indicates another location in memory storing an executable instruction). Given this property of GCS regions, it can be extremely useful to set the valid stack cap value (which is expected to be on the incoming stack in a region allocated as GCS region type, when a stack switching operation is performed) to specify the page address of the same page that contains the address of the location storing the stack cap value itself. This reduces the risk of incorrect control flow being caused by accidentally interpreting the stack cap value as an exception return address or function return address when accessing the GCS data structure in the GCS memory region, which might be a risk if an attacker compromises control flow in the victim code so that a function return or exception return is triggered when the stack cap value is at the top of the stack. Even if the attacker does cause such an erroneous access to the stack causing the stack cap value to be returned as the protected return address for an exception return or function return, the corresponding return operation will cause a fault to be identified (either directly at the time of the stack access or the return operation, or later when attempting to fetch an instruction from an address represented by the stack cap value which was erroneously interpreted as a return address), because as the stack cap value points to its own page and this is expected to be a page allocated as the GCS region type, that branch or instruction fetch is not permitted.

The condition of the incoming data value specifying the page address may not be the only condition required to be passed by the incoming data value to satisfy the check in the stack pointer switch validity checking operation. Other conditions can also be applied.

For example, in some implementations, the at least one stack cap value validity condition also comprises a condition that a least significant portion of the incoming data value has a bit pattern incapable of being specified by the least significant portion of any valid instruction address. More particularly, the at least one stack cap value validity condition may include a condition that the least significant portion has a specific bit pattern used to signify a valid stack cap value, where that bit pattern is incapable of being specified by the least significant portion of any valid instruction address.

For example, this specific bit pattern can have at least one bit with a bit value of 1. For some processor architectures, instruction encodings may have a certain number of bits, and there may be a requirement that any instruction is stored at an address aligned to an address boundary at a multiple of the instruction size. For example, the instructions may have a 32-bit encoding and so may be required to be stored at addresses aligned to 4-byte address boundaries (for architectures with a different instruction size, the address boundaries may be at a different granularity). If there is an attempt to perform an instruction fetch or branch to an unaligned address, then a fault may be signalled. Hence, by encoding the stack cap value so that its least significant bits have a non-zero bit pattern incapable of being specified by the least significant portion of any valid instruction address (as that pattern would cause the value to be an unaligned instruction address if it was treated as an instruction address), this can provide another measure for detecting erroneous attempts to perform an exception return or function return using the stack cap value as the return address, therefore improving security.

Hence, the "stack cap value" allocated onto an inactive stack (expected to be verified on switching back to that stack) can be seen as "capping" (or "sealing") the stack in the sense that having the stack cap value at the top of the stack prevents use of the stack for controlling return operations until the cap has been removed.

The incoming stack pointer value may be defined independent of the outgoing stack pointer value, so that the switch from the outgoing stack pointer value to the incoming stack pointer value can represent a switch to an entirely different stack structure, rather than merely an increment or decrement to the current stack pointer performed when pushing an entry onto the stack or popping an entry from the stack.

The processing circuitry may perform the stack pointer switch validity checking operation in response to a first stack pointer switching instruction specifying an operand indicating the incoming stack pointer value. Hence, the incoming stack pointer value may be defined as an arbitrarily specified operand of the first stack pointer switching instruction (e.g. by specifying the incoming stack pointer value in a general purpose register specified by the first stack pointer switching instruction).

The apparatus may have a stack pointer register to store the stack pointer. The outgoing stack pointer value for the stack pointer switch may be the current value specified for the stack pointer register at the time the first stack pointer switching instruction is executed.

In response to the first stack pointer switching instruction, when the stack pointer switch validity checking operation is successful (i.e. the incoming data value obtained based on the incoming stack pointer value meets the at least one stack cap value validity condition, and any other checks (dependent on the particular implementation) are satisfied), the processing circuitry may update the stack pointer register from the outgoing stack pointer value to the incoming stack pointer value.

In some examples, the first stack pointer switching instruction may be the sole mechanism available for software (typically user-level software) executing in the least privileged execution state of the processing circuitry to cause a switch of the stack pointer. The software executing in the least privileged execution state may not have direct write access to the stack pointer register (it is possible that software may still be able to directly write to the stack pointer register when executing in a more privileged execution state). By restricting the ability for user-level software to cause a switch of stack pointer, this improves security. As the software has to use the first stack pointer switching instruction to cause the switch of stack pointer, this enforces that the stack pointer switch validity checking operation is performed. For example, attempts by the software to execute a system register instruction which requests an update to the stack pointer register may be rejected when a current privilege level is of lower privilege than a certain threshold privilege level.

In some implementations, the first stack pointer switching instruction may also trigger the outgoing stack capping operation mentioned above. Hence, in response to the first stack pointer switching instruction, the current value specified for the stack pointer register at the time of executing the first stack pointer switching instruction is used as the outgoing stack pointer value, and a valid stack cap value specifying the (virtual) page address corresponding to the outgoing stack pointer value is formed and written to a location at an address corresponding to the outgoing stack pointer value.

However, in practice, performing both the stack pointer switch validity checking operation and the outgoing stack capping operation in the same instruction may require two different target addresses to be translated: a load address of the incoming data value to be loaded based on the incoming stack pointer value, and a store address of the valid stack cap value to be stored based on the outgoing stack pointer value. Some circuit implementations may not be capable of handling two different address translations in response to the same instruction, so an instruction set architecture which requires both the stack pointer switch validity checking operation and the outgoing stack capping operation to be performed in one instruction (while possible) can create significant design challenges for micro-architectural circuit designers.

Therefore, to simplify the circuit design implementation, it can be useful to define two separate architectural instructions for performing the stack switching: a first stack pointer switching instruction triggering the stack pointer switch validity checking operation and, if that validity checking operation is successful, updating the stack pointer register to switch the stack pointer to the incoming stack pointer value; and a second stack pointer switching instruction to perform the outgoing stack capping operation.

However, with the two-instruction approach, the outgoing stack pointer value (replaced in the stack pointer register in response to the first stack pointer switching instruction) should be "remembered" between processing of the first stack pointer switching instruction and the second stack pointer switching instruction. From an architectural point of view, it may be undesirable to consume an architectural register to retain the outgoing stack pointer value, as this may increase register pressure and also it may be undesirable to expose the outgoing stack pointer value to the software executing after the switch of stack pointers, which might be a risk if an architectural register was allocated to store the outgoing stack pointer value for use as an operand for the second stack pointer switching instruction.

Therefore, the instruction set architecture may define that the first stack pointer switching instruction architecturally writes the outgoing stack pointer value to the incoming stack (temporarily), so that the outgoing stack pointer value is retained by writing it to the memory address space. This does not exclude some micro-architectural implementations being able to use micro-architectural mechanisms such as register renaming or store buffering to provide the second stack pointer switching instruction with faster access to the outgoing stack pointer value nominally written to memory by the first stack pointer switching instruction, than would be the case if the second stack pointer switching instruction actually had to access memory (e.g. buffering within the processing circuitry hardware can be used, as it is expected to be frequent that the outgoing stack pointer is needed by the second instruction relatively shortly after being stored by the first instruction). Nevertheless, such micro-architectural circuit mechanisms are optional and from an architectural (software-visible) point of view the instructions may be processed as if the first stack pointer switching instruction writes the outgoing stack pointer value to memory and the second stack pointer switching instructions reads it from memory.

Hence, in response to the first stack pointer switching instruction, the processing circuitry may push, to a location having an address selected based on the incoming stack pointer value, an in-progress token value specifying the outgoing stack pointer value. This temporarily makes the outgoing stack pointer value accessible in the architecturally-visible memory address space so that it is acceptable to overwrite the outgoing stack pointer value in the stack pointer register to switch the stack pointer to the incoming stack pointer value, even though the outgoing stack has not been capped yet.

For a load operation to load the incoming data value to be verified in the stack pointer switch validity checking operation and a store operation to push the in-progress token value to the location having the address selected based on the incoming stack pointer value, the processing circuitry may perform the load operation and the store operation atomically. Hence, a mechanism is provided to either prevent intervening accesses to the address selected based on the incoming stack pointer value between the load and store being performed, or if such intervening accesses are possible, to detect them and correct such lack of atomicity (e.g. by triggering a pipeline flush and re-executing the first stack pointer switching instruction). Any known atomic access mechanism used to enforce atomicity between a load and a store can be used.

In response to a second stack pointer switching instruction, the processing circuitry may verify whether a given data value, obtained by the memory access circuitry in response to a memory access request specifying an address determined based on a current stack pointer in the stack pointer register, is a validly formed in-progress token value; and in response to verifying that the given data value is a validly formed in-progress token value: trigger a write, to a location having an address determined based on a given stack pointer value specified by a portion of the given data value, a valid stack cap value specifying, in the predetermined portion of the valid stack cap value, a page address indicative of a page of address space comprising an address determined based on the given stack pointer value. In some examples, the address determined based on the given stack pointer value may be an address offset from the given stack pointer value by an amount corresponding to the size of one stack entry. If the second stack pointer switching instruction is executed after the first stack pointer switching instruction, it is expected that the given data value obtained based on the current stack pointer (at the time of the second stack pointer switching instruction) should be the in-progress token value previously written to the incoming stack data structure by the first stack pointer switching instruction. However, it will be appreciated that the hardware circuit logic of the processing circuitry has no way of knowing whether the second stack pointer switching instruction actually follows the first stack pointer switching instruction—the hardware circuit logic simply implements a "black box" circuit logic which implements the function of the second stack pointer switching instruction based on its defined operands, independent of what other instructions software chose to execute before that instruction. Therefore, there is no circuitry in hardware which would enforce that the operands of the second stack pointer switching instruction do correspond with the operands previously used for the first stack pointer switching instruction.

Hence, the second stack pointer switching instruction checks that the given data value obtained based on the current stack pointer in the stack pointer register corresponds to a validly formed in-progress token value, and if it is valid, uses the given stack pointer value provided by that in-progress token value (expected, but not guaranteed, to be the address of the outgoing stack structure previously switched away from by the earlier first stack pointer switching instruction) to access a corresponding stack structure and push the valid stack cap value to that structure. Again, the valid stack cap value is formed so that it specifies, in the predetermined portion, the page address indicating the page of address space comprising the address indicated by the given stack pointer value. This ensures that a later check performed for the stack pointer switch validity checking operation will pass when software later wishes to switch the corresponding stack back in as the incoming stack for the stack pointer switching operation.

In response to the second stack pointer switching instruction when the given data value is verified as being the validly formed in-progress token value, the processing circuitry is configured to update the current stack pointer in the stack pointer register to indicate removal of an entry providing the given data value from a corresponding stack data structure. For example, the update to indicate removal of the entry may be the same type of update to the current stack pointer that would be performed when popping an entry from the stack (e.g. either an increment or a decrement, depending on which direction the stack grows/shrinks on pushes/pops). This update means the in-progress token value would no longer be accessed on a subsequent pop access to the stack. It is not necessary to actually delete the in-progress token value from memory, as the update to the stack pointer means it would not be accessed on a subsequent access based on the stack pointer. The in-progress token value may in any case be overwritten later if there is a subsequent push operation to push a new entry to the stack.

In response to the second stack pointer switching instruction, the processing circuitry may verify that the given data value is the validly formed in-progress token value when a least significant portion of the given data value has a bit pattern incapable of being specified by the least significant portion of any valid instruction address and incapable of being specified by any value meeting the at least one stack cap value validity condition. Again, it can be useful for the in-progress token value to have a least significant portion which corresponds to an unaligned instruction address so that any attempt to use the in-progress token value as a return address will cause an unalignment fault as discussed above. Also, it can be desirable to have different encodings for the least significant portion of a valid stack cap value and a valid in-progress token value, to avoid attackers using erroneous control flow to circumvent the protections (e.g. this allows errors where only one of the first/second stack pointer switching instructions are executed, rather than both executed together, to be detected).

In response to the second stack pointer switching instruction, the processing circuitry may trigger an error handling response in response to determining that the given data value is not a validly formed in-progress token value.

Both for the error handling response taken when the incoming data value fails the at least one stack cap value validity condition for the stack pointer switch validity checking operation, and the error handling response taken in response to the second stack pointer switching instruction when the given data value is not a validly formed in-progress token value, the error handling response could be implemented in a number of ways. For example, the error handling response may comprise at least one of: signalling a fault; setting an error reporting indication; and setting the stack pointer to an invalid value. In some implementations, the error handling response may directly cause processing to be halted (e.g. signalling a fault or exception as soon as the error is detected). Other examples may use a more indirect means of causing the fault to be notified, so that the fault itself may not happen until later on. For example, by setting the stack pointer to an invalid value which cannot be a valid memory address, a subsequent attempt to access memory based on the invalid stack pointer may trigger a fault. This may sometimes be simpler to implement in hardware than triggering the fault based on the checks of the first/second stack pointer switching instructions directly. For example, a reserved portion of the address space with upper address bits having a value other than all 0s or all 1s may be reserved so that it cannot be specified as a valid address, so by setting the stack pointer to an address in this reserved portion if the error handling response is required, this may cause a later memory access to fault so that erroneous processing can still be averted. It will be appreciated that the particular error handling response taken may vary between different implementations of the general technique described above. Also, in some cases, the error handling response taken for a failed stack cap value validity check may be different to the error handling response taken for the second stack pointer switching instruction when the given data value is not a validly formed in-progress token value.

The techniques discussed above may be implemented within a data processing apparatus which has hardware circuitry provided for implementing the memory access circuitry and processing circuitry discussed above.

However, the same technique can also be implemented within a computer program which executes on a host data processing apparatus to provide an instruction execution environment for execution of target code. Such a computer program may control the host data processing apparatus to simulate the architectural environment which would be provided on a hardware apparatus which actually supports target code according to a certain instruction set architecture, even if the host data processing apparatus itself does not support that architecture. The computer program may have memory access program logic and processing program logic which controls the host data processing apparatus to emulate the features discussed above, including support for the stack pointer switch validity checking operation. The memory access program logic performs stack accesses based on a stack pointer. The processing program logic performs the stack pointer switch validity checking operation, including the checking of whether the predetermined portion of the incoming data value loaded based on the incoming stack pointer value specifies the given page address of the page (in simulated address space, rather than the host address space of the host data processing apparatus) comprising the address derived from the incoming stack pointer value. Hence, when target code which requires a switch of stack pointer from an outgoing stack pointer value to an incoming stack pointer value is executed in the instruction execution environment provided by the simulation computer program executing on the host data processing apparatus, the same functions as discussed above can be achieved even if the host data processing apparatus does not itself support the stack pointer switch validity checking operation in hardware.

Such a simulation program can be useful, for example, when program code written for one instruction set architecture is being executed on a host processor which supports a different instruction set architecture. Also, the simulation can allow software development for a newer version of the instruction set architecture to start before processing hardware supporting that new architecture version is ready, as the execution of the software on the simulated execution environment can enable testing of the software in parallel with ongoing development of the hardware devices supporting the new architecture. The simulation program may be stored on a storage medium, which may be a non-transitory storage medium.

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 (an example of processing circuitry) includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 26 for performing load/store operations to access data in a memory system 8, 30, 32, 34. The load/store unit is an example of memory access circuitry. A memory management unit (MMU), which is an example of memory management circuitry. 28 is provided for performing address translations between virtual addresses specified by the load/store unit 26 based on operands of data access instructions and physical addresses identifying storage locations of data in the memory system. The MMU has a translation lookaside buffer (TLB) 29 for caching address translation data from page tables stored in the memory system, where the page table entries of the page tables define the address translation mappings and access permissions which govern, for example, whether a given process executing on the pipeline is allowed to read or write data or execute instructions from a given memory region. The MMU 28 may have circuitry to request memory accesses during page table walks, when the page table structures are traversed to locate the page table entry corresponding to a required address. The memory management unit is an example of memory management circuitry.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline implementation, and the processor may include many other elements not illustrated for conciseness. While FIG. 1 shows a single processor core with access to memory 34, the apparatus 2 also could have one or more further processor cores sharing access to the memory 34 with each core having respective caches 8, 30, 32.

Figure 2:
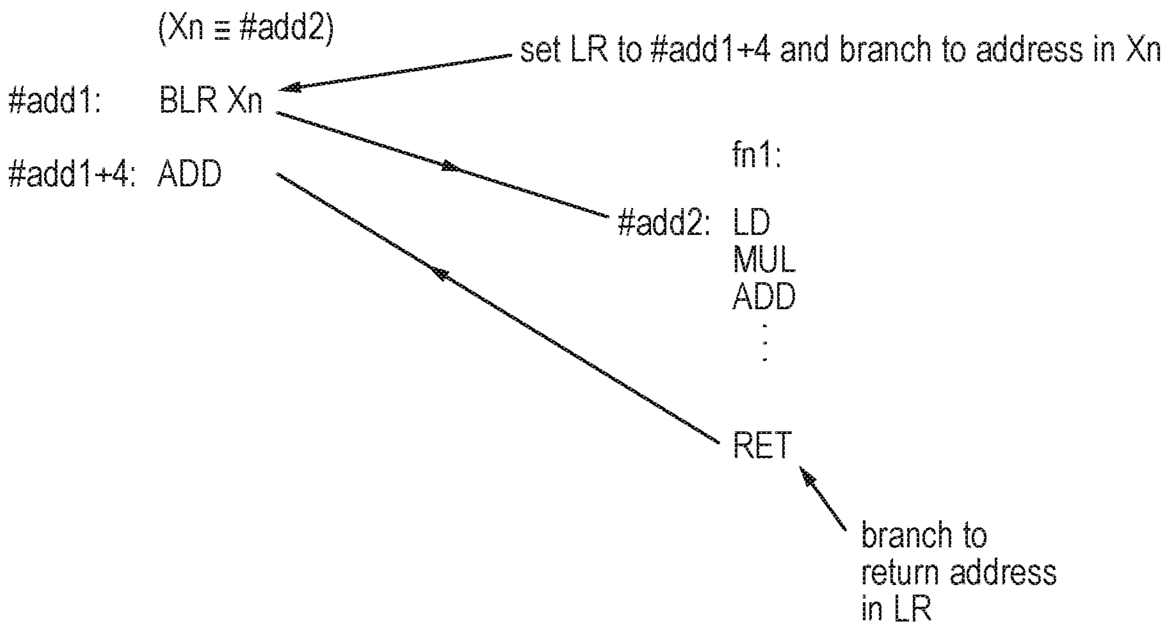
FIG. 2 illustrates an example of a function call.

FIG. 2 illustrates an example of calling a function (labelled fn1 for ease of reference) and returning from the function. A function (also known as a procedure) is a sequence of instructions that can be called from another part of a program and which when complete returns processing to the part of the program flow from which the function was called. The same function can be called from a number of different locations in the program, and so a function return address is stored on calling the function, so that the function return can distinguish which address program flow should be returned to.

For example, as shown in FIG. 2, a branch with link instruction BLR may be executed at the point (represented by address #add1) where the function is to be called, to cause program flow to branch to an instruction at a branch target address #add2 specified using operands of the branch with link instruction. The branch with link instruction also causes the processing circuitry to set a link register (a designated register used for tracking a function return address) to an address of the next instruction after the branch with link instruction (in this example, the function return address is #add1+4). After the branch has been taken, a number of instructions (e.g. LD, MUL, ADD, etc.) are executed within the function code and when the function is complete a return branch instruction RET is executed which causes a branch to the instruction indicated by the return address stored in the link register.

If no other functions are called from within fn1, and no exception occurs before the return branch at the end of fn1 is reached, then the address in the link register should still be the same as set when fn1 was called.

However, often a first function fn1 called by background code may itself call a further function (fn2, say) in a nested manner, and in this case the function call to fn2 would overwrite the return address stored in the link register, and so prior to calling that further function, the function code of the first function fn1 should include an instruction to save the return address from the link register to a data structure in memory (e.g. a stack structure, operated in a last-in-first-out (LIFO) manner), and after returning from fn2 the function code of fn1 should restore the return address to the link register before executing the return branch. The responsibility for saving and restoring function return state such as the return address would typically lie with the software (there may be no architecturally-enforced hardware mechanism for saving the return address).

However, while the function return address is stored in memory, it may be vulnerable to an attacker modifying that data, for example using another thread executing on another processor core, or by interrupting the called function and executing other code in the meantime which overwrites the return address stored in memory. Alternatively, the attacker could execute some instructions which aim to modify the address operands of the instruction which restores the return address from memory to a register, so that the data loaded from memory is not the same as the return address which was originally saved to memory before calling a nested function. If the attacker can cause the return branch to branch to a point in the program flow other than the instruction after the function calling branch, the attacker may be able to cause the software to behave incorrectly, and may be able to circumvent certain security protections or cause undesired operations to be performed.

A function call is one example of an operation which generates return state information providing information about the state to which the processing circuitry is to be restored at a later time. Another scenario when return state information may be captured may be when an exception is taken, at which point exception handling circuitry provided in hardware, or a software exception handler, may capture exception return state information, such as an exception return address indicating an address of an instruction to be executed after returning from handling an exception, and/or saved processor state information indicating a mode or execution state in which the processor is to execute after returning from the exception. For example, the saved processor state information could indicate which exception level the exception was taken from, as well as other information about the operating state of the processor at the time the exception was taken. As with function calls, exceptions may be nested and so exception return state captured for one exception can be saved to memory (either automatically in hardware, or by a software exception handler) when another exception is taken, and so may be vulnerable to tampering by an attacker while it is stored in memory. These types of attacks may be referred to as return oriented programming (ROP) attacks. It can be desirable to provide an architectural countermeasure against such attacks.

Figure 3:
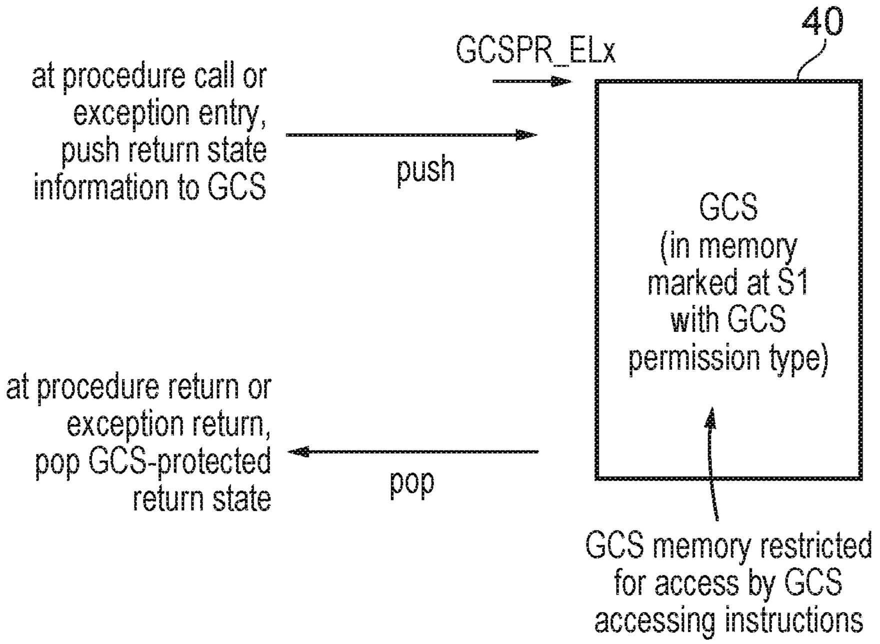
FIG. 3 illustrates an example of guarded control stack (GCS) push and pop operations.

FIG. 3 illustrates an approach for protecting against ROP attacks using a protected data structure 40 in memory called a "guarded control stack" (GCS). The location of the GCS data structure within the memory address space may be selected by software, but the hardware provides architectural features designed to protect the GCS data structure against tampering by a malicious attacker.

As shown in FIG. 1, the registers 14 may include control registers including one or more guarded-control-stack-pointer (GCSPR) registers 36 for storing a stack pointer indicating an address on the GCS data structure. In some examples, the GCS pointer register may be a banked set of registers, provided separately for at least two execution states (e.g. exception levels), to enable software operating at different execution states to reference different GCS structures within memory without needing to reprogram a shared stack pointer register after each transition of execution state. Other examples could use a single GCS pointer register and software could update the stack pointer stored in the GCS pointer register on a transition between execution states.

As shown in FIG. 3, the GCS data structure 40 is stored in a region of memory designated as being a GCS region of memory by a memory attribute specified, either directly or indirectly, by an associated page table entry of the page tables used by the memory management unit (MMU) 28 for controlling address translation and access permission checks. The GCS region attribute could be specified either directly within the encoding of the corresponding page table entry for a memory region comprising at least part of the GCS data structure, or could be referenced indirectly within a register referenced by that page table entry.

When a memory region is identified as being the GCS region, then write access to that region is restricted to write requests triggered by the processing circuitry 16 when executing a certain subset of GCS-accessing instructions. General purpose store instructions used by software for general store operations not intended to access the GCS structure are not considered one of the restricted subset of GCS-accessing instructions. The MMU 28 may still permit the GCS structure to be read using a general purpose load instruction which causes issuing of a read request which is not a GCS memory access request. When a memory access request is requesting access to a GCS region, the request is a write request, and the request is not a GCS memory access request triggered by one of the restricted subset of GCS-accessing instructions, then the memory access request is rejected and the fault is signalled. The subset of GCS-accessing instructions may include at least a GCS push instruction which causes return state information (such as the function return address from the link register, or an exception return address or saved processor state captured on taking an exception) to be pushed to a location on the GCS structure determined using the stack pointer indicated in the GCS pointer register 58. The GCS push instruction also causes the stack pointer to be advanced by an amount depending on the size of the stack frame pushed to the GCS (e.g. by incrementing the stack pointer by the size of the stack frame if the GCS is managed as an ascending stack, or by decrementing the stack pointer by the size of the stack frame if the GCS is managed as a descending stack). GCS-accessing instructions may also include at least one form of GCS pop instruction which pops protected return information from the GCS structure. As well as returning the return information popped from the stack, a GCS pop instruction also causes the stack pointer to be adjusted in the opposite direction to the direction in which the stack pointer is adjusted for a GCS push instruction (e.g. by decrementing the stack pointer by the size of the stack frame if the GCS is managed as an ascending stack, or by incrementing the stack pointer by the size of the stack frame if the GCS is managed as a descending stack). As described below, the GCS accessing instructions may also include GCS stack pointer switching instructions GCSSS1, GCSSS2, which may be allowed to write special purpose values onto the stack in the GCS memory region for the purpose of protecting the stack against inappropriate switches of stack pointer in the GCSPR 36.

The GCS-accessing instructions may not be allowed to access memory regions which are not designated by the page table attributes as the GCS region type. Hence, a fault can be signalled if an attempt to perform a GCS access (including the memory accesses for the GCS stack pointer switching instructions GCSSS1, GCSSS2) is made when the memory region targeted by the access is not marked as the GCS region type. By prohibiting use of GCS-accessing instructions for accessing non-GCS regions, this discourages programmers from using the GCS-accessing instructions unless it is really intended to be a GCS access, to reduce the attack surface available to an attacker. Also, this gives confidence that the data accessed by a GCS pop instruction or verified by one of the GCS stack pointer switching instructions GCSSS1, GCSSS2 is not able to be modified by non-GCS instructions.

The GCS structure is separate from any data structure used by the software to maintain saved return state information within memory to handle nesting of function calls or exceptions. Hence, the GCS structure is not intended to eliminate the need for software itself to track saving and restoring of return state information when function calls or exceptions are nested (the software-triggered saving of return state may continue in the same way as on a processor not supporting the GCS-protected architectural measures discussed above). Instead, the GCS structure provides a region of protected memory which is protected against tampering by compromised program code, which can be used to provide information for verifying the return state information intended to be used by the software to return from processing of the function call or an exception.

In some implementations the GCS pop instruction, which causes protected return state information to be popped from the GCS structure, may also cause the processing circuitry 16 to compare the popped return state with current return state information stored in registers (e.g. a link register for a function return, or an exception return address register and/or saved processor state register for an exception return), and to signal a fault if there is a mismatch between the return state information popped from the GCS structure 40 and the intended return state information which software intends to use for a function/exception return. Hence, software can be protected against tampering by including instances of the GCS push and GCS pop instruction within the program code to be executed around a function call/return or exception entry/return.

Other implementations may define a separate instruction for verifying whether the intended return state information is valid, separate from the instruction which pops return state information from the GCS structure 40.

Alternatively, the GCS pop instruction could pop the protected return state from the GCS directly to one or more registers used to specify the return state for an exception return or function return (or could be combined with the exception/function return instruction to both pop the protected return state and use that state for controlling an exception/function return), in which case it is not essential to carry out a step of verifying whether software-provided intended return state information is valid, as in such an implementation the GCS-protected return state is used directly to control the exception/function return. For example, for GCS protection of a function return address, the function return address could be popped directly to the link register replacing any software-managed function return address that software may have placed there based on its own managed stack structure.

Also, other types of GCS accessing instructions could also be supported. Some instructions, which have other functions in a mode where use of the GCS is disabled, could cause the processing circuitry 16 to perform additional functions (such as additional GCS-mode-specific security checks) when executed when the GCS mode is enabled (control state in control registers may control whether the GCS mode is enabled).

In general, by providing architectural support for defining a GCS memory region type for use for the GCS structure 40, and restricting write access to the GCS region type to a limited subset of GCS accessing instructions (which may not be allowed to access memory regions other than the GCS region type), this reduces the attack surface available for an attacker to try to tamper with protected return state information stored on the GCS structure 40.

Figure 4:
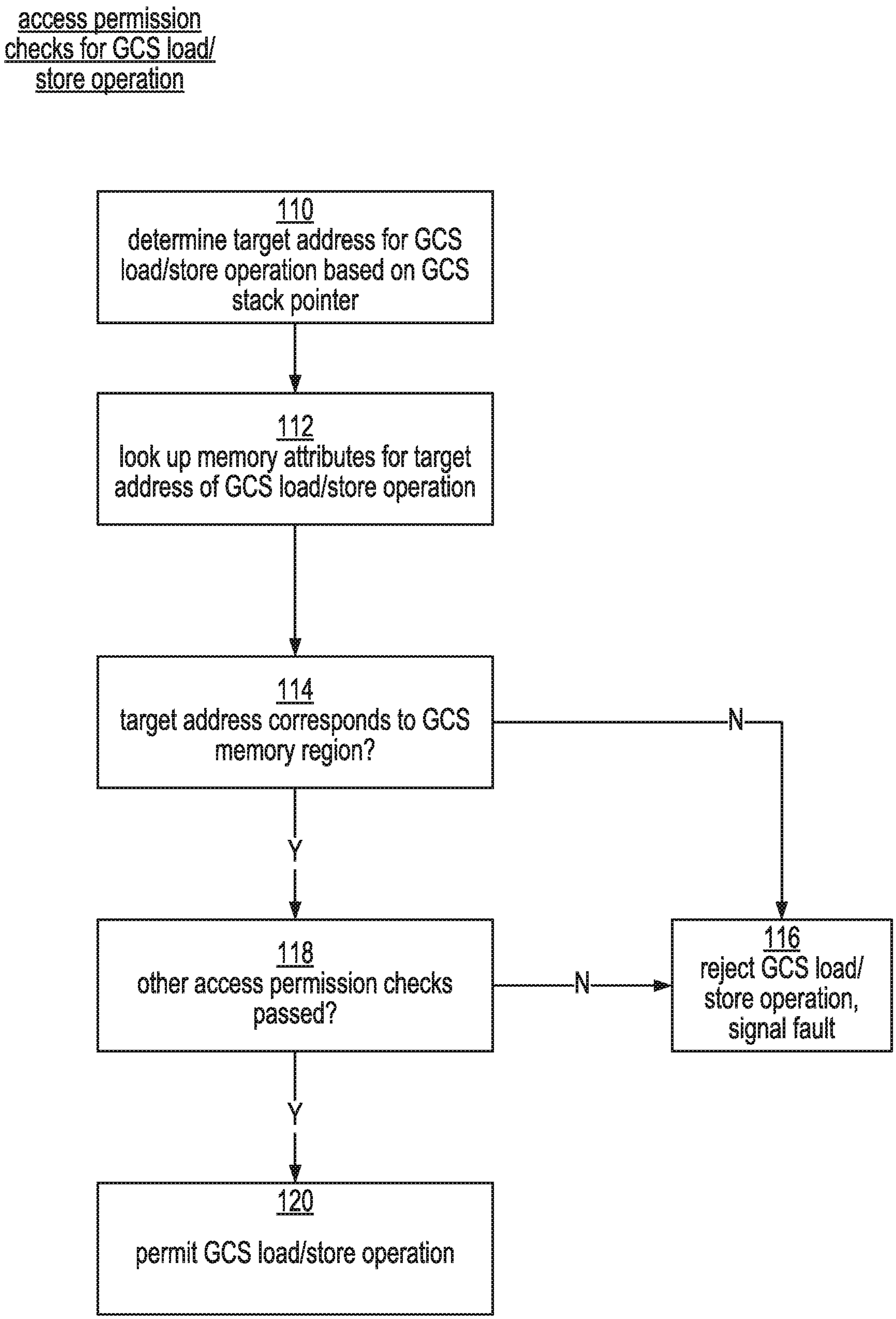
FIG. 4 illustrates access permission checks for a GCS load/store operation.

FIG. 4 is a flow diagram illustrating access permission checks for a GCS load/store operation. The GCS load/store operation is a load/store operation triggered by one of the class of GCS-accessing instructions (e.g. the GCS-accessing instructions include GCS push and pop instructions and GCS stack pointer switching instructions GCSSS1, GCSSS2). At step 110 the processing circuitry 16 determines the target address for a GCS load/store operation based on the GCS pointer in register 36. At step 112 the memory management unit 28 looks up the target address in its TLB 29, to obtain memory attributes for the target address of the GCS load/store operation. At step 114, the MMU 28 determines whether the target address corresponds to a GCS memory region, which is a dedicated type of memory region for use for storing the GCS data structure. If the target address does not correspond to the GCS memory region type, then at step 116 the GCS load/store operation is rejected. A fault is signalled, which may interrupt the processing being performed and cause an exception handler to deal with the cause of the fault. By suppressing GCS accesses to regions not marked as the GCS memory region type, this prevents GCS load/store instructions being misused for accessing non-GCS memory, and also means that the protected return state returned by GCS load operation can be trusted because it cannot have been tampered with by non-GCS instructions.

If at step 114 the target address was determined correspond to a GCS memory region, then at step 118 the MMU 28 determines whether any other access permission checks are passed. These checks could check other attributes such as read/write permission information indicating whether read requests and write requests respectively are permitted to be memory region, or attributes defining a subset of execution states of the processor 2 in which the region is allowed to be accessed. If any other access permission checking fails then again at step 116 the GCS load/store operation is rejected and a fault is signalled. Fault type information set by the processor on occurrence of the fault may differ depending on whether the cause of the fault was a GCS access to a non-GCS memory region or another type of access permission violation. If all other access permission checks are passed then at step 120 the GCS load/store operation is permitted.

Figure 5:
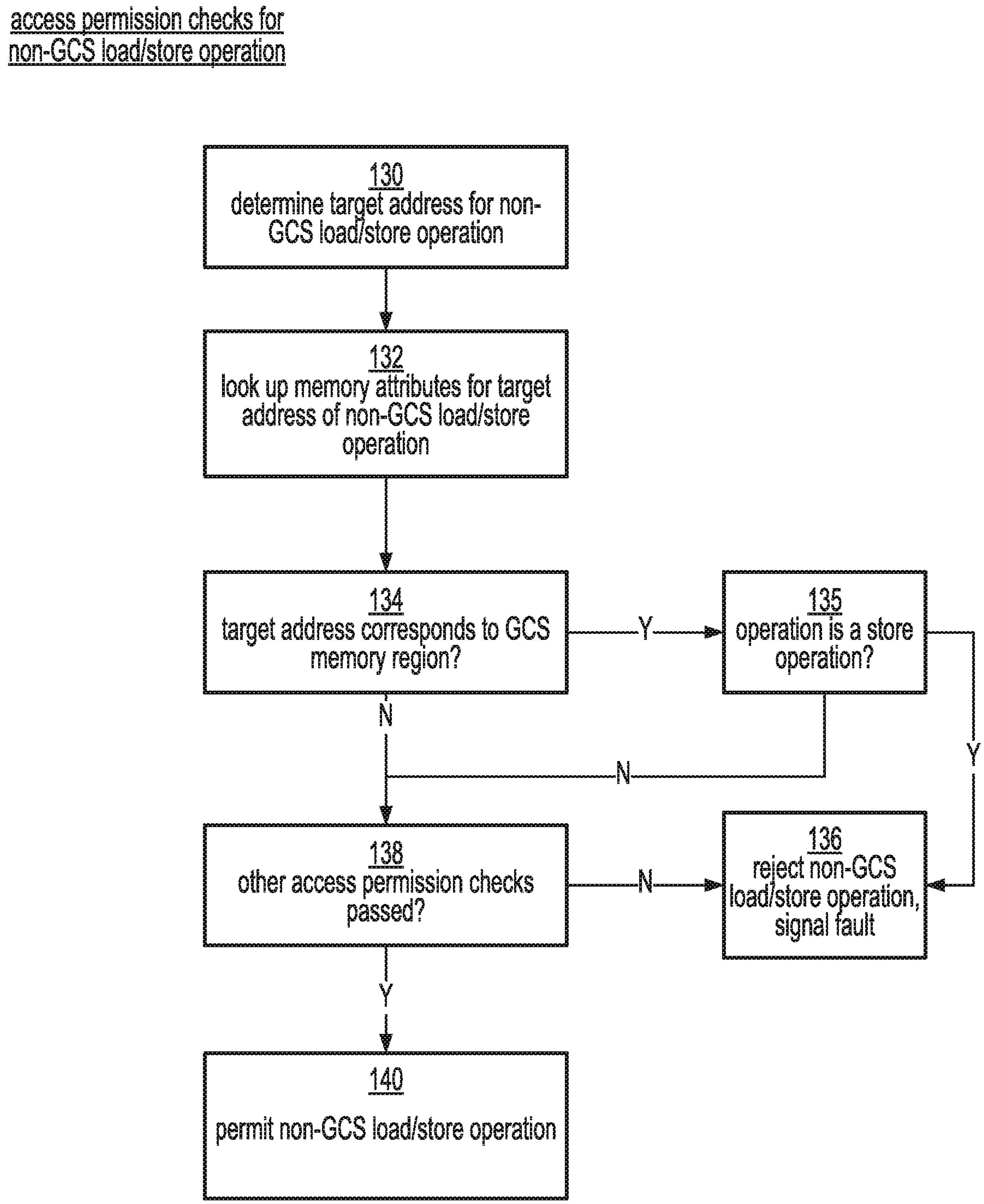
FIG. 5 illustrates access permission checks for a non-GCS load/store operation.

FIG. 5 shows similar access permission checks performed for a non-GCS load/store operation (a load/store triggered by an instruction other than the class of GCS-accessing instructions). Steps 130, 132 and 134 are similar to steps 110, 112, 114 of FIG. 4. Compared to FIG. 4, at step 134 of FIG. 5 the response to the check of whether the target address corresponds the GCS memory region is the opposite way round for non-GCS load/store operations compared to GCS load/store operations, in that when the target address corresponds to a GCS memory region non-GCS store operations are rejected, while GCS load/store operations are rejected if the target address does not correspond to a GCS memory region.

Hence, if it is determined at step 134 that the target address corresponds to the GCS memory region, and it is determined at step 135 that the current load/store operation is a non-GCS store operation, then at step 136 the non-GCS load/store operation is rejected and the fault is signalled. Non-GCS load operations may potentially be allowed even if they target a GCS memory region, subject to the outcome of any other access permission checks performed at step 138. If any other access permission checks fail then again the non-GCS load/store operation is rejected at step 136. Otherwise, if either the target address does not correspond to a GCS memory region (N at step 134) or the non-GCS operation is a load operation (N at step 135), and any other access permission checks (not relating to GCS access checking) are passed at step 138, then at step 140 the non-GCS load/store operation is permitted.

Figure 6:
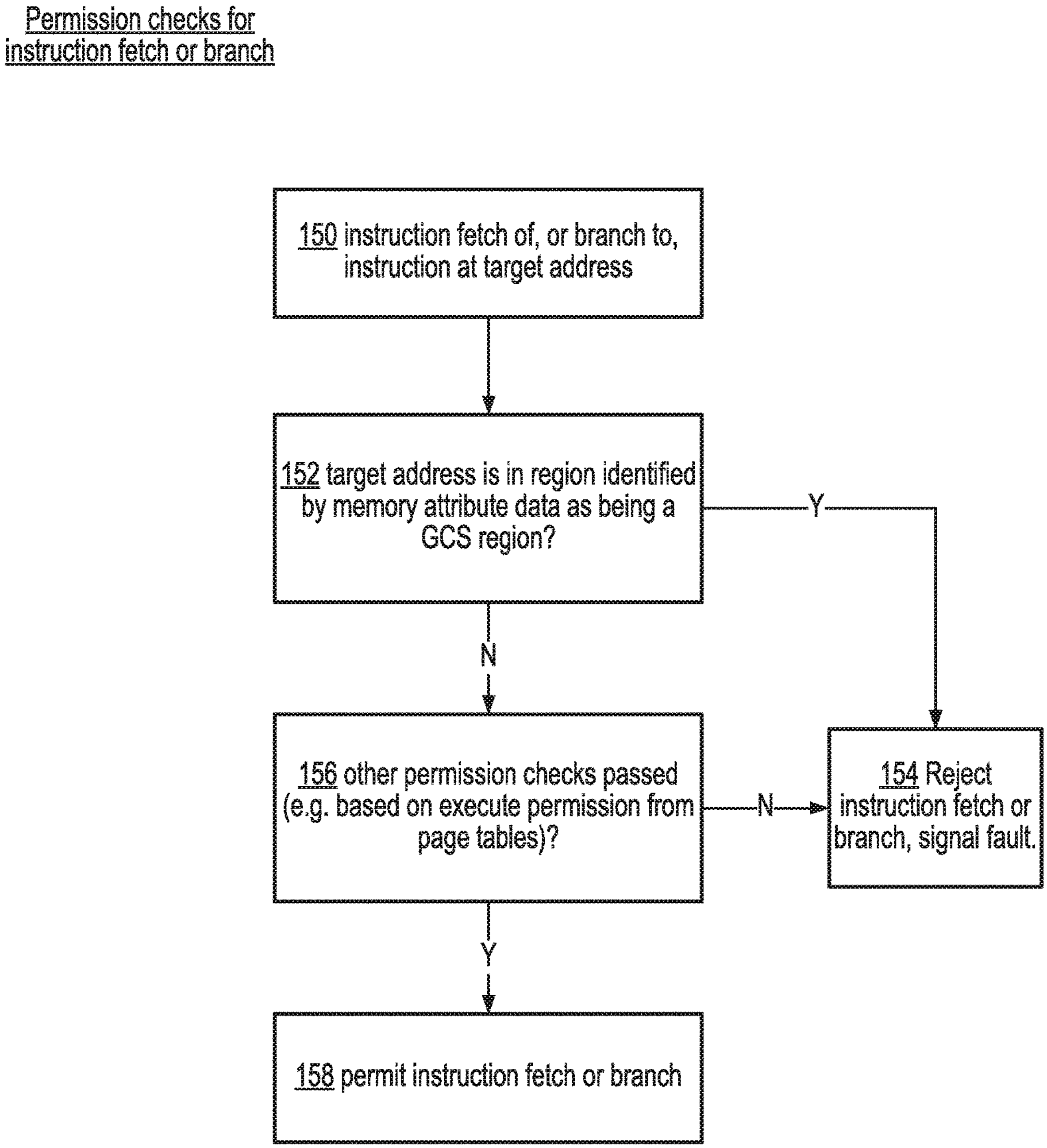
FIG. 6 illustrates permission checks for an instruction fetch or branch operation.

FIG. 6 is a flow diagram illustrating permission checks for an instruction fetch or branch operation. At step 150 the fetch stage 6 requests fetching of an instruction associated with a target address, or a branch to an instruction at the target address is detected (the branch could be detected either based on execution of a branch instruction by the branch unit 24 of the execute stage 16, or based on the prediction of a future branch made by a branch predictor associated with the fetch stage 6). In response to the instruction fetch or branch, at step 152 the MMU 28 looks up the target address in its TLB 29 to identify memory attribute data corresponds the target address (with a page table walk to memory being performed if there is a TLB miss), and determines whether the target address is in a region identified by memory attribute data as being a GCS region. If the target address is in a GCS region, then at step 154, the instruction fetch or branch is rejected and a fault is signalled. This prevents data stored on the GCS structure being treated as an executable instruction which could risk unpredictable results.

If the target address is not in a GCS region then in principle an instruction loaded from that address can be executed, subject to any other permission checks performed at step 156. For example these checks may include page table based checks of execute permission data indicated in the memory attribute data for the target address. If those other permission checks are passed, then at step 158 the instruction fetch or branch can be permitted. If the other permission checks fail, then again at step 154 the instruction fetch or branch is rejected and a fault signalled.

Hence, GCS memory regions are restricted to providing data values (such as address pointers and other information), and cannot provide executable instruction code because attempts to fetch an instruction from, or branch to an instruction in, a GCS region will trigger a fault.

The measures described above can be useful to protect the contents on the GCS data structure against tampering by an attacker, when handling function returns and exception returns within a particular process.

However, another possible risk to control flow may be when the GCS pointer in register 36 is switched from an outgoing stack pointer value associated with an outgoing stack data structure to an incoming stack pointer value associated with an incoming stack data structure. Such switches may be common (and allowed) when switching between threads of execution which use different GCS data structures, but could be an avenue that an attacker tries to use to cause incorrect processing in an attempt to expose sensitive information accessible to a victim process which should not be accessible to the attacker. For example, if the incoming stack pointer value for a stack pointer switch is caused to be an address which does not correspond to the correct GCS data structure for the incoming thread, there could be a risk of inappropriate control flow being triggered, particularly if the address specified for the incoming stack pointer value happens to be an address within a GCS region of memory (e.g. an address pointing to return state on a GCS structure associated with a different thread). Even if the incoming stack pointer value is an address within the correct GCS data structure for the incoming thread, there could still be a risk of error if the incoming stack pointer value is set to a location other than the location representing the current "top" of the stack, as this could lead to valid return state for one exception/function return being used as the return address for a different exception/function return, still causing incorrect information.

Such errors in the incoming stack pointer value could arise by accident due to a programming error, or maliciously by an attacker who compromises the executed code to cause instructions to be executed which switch the value of the GCS pointer in register 36 to point to an incorrect location, e.g. a location in an attacker-controlled GCS data structure (in a GCS region, so not caught by the checks of FIG. 4) which has been pre-populated with return addresses designed to trick the victim software process into branching to an incorrect sequence of code.

One approach for mitigating against such erroneous setting of the incoming stack pointer value could be to require each write to the GCSPR 36 to be trapped to a more privileged execution states so that a more privileged process such as an operating system or hypervisor can verify whether the new value for the stack pointer is safe before updating the GCSPR 36. However, this would adversely affect performance. Switches of GCS pointer are very common when switching between application-level threads and to ensure fast switching and hence high performance, it may be desirable to allow such switches of GCS pointers to take place without calling into a more privileged process.

It can also be undesirable to allow direct access to the GCS pointer register 36, to reduce the risk of the attack of the form described above.

Therefore, some instructions can be provided for controlling switching of the value of the stack pointer in GCS pointer register 36, which may implement some sanity checks for detecting inappropriate setting of the incoming stack pointer value. These GCS pointer switching instructions are considered to be members of the GCS-accessing class of instructions, so that writes to a GCS region triggered by these instructions can pass the checks shown in FIGS. 4 and 5.

When switching between different threads, the software stack (tracked using a separate stack pointer from the GCS pointer) is switched by the software and also the current Guarded Control Stack is switched. To ensure the software cannot switch to any arbitrary location on the incoming GCS, a stack cap value is added to the outgoing GCS when switching away from that GCS, and the cap value is verified when switching to that GCS as the incoming stack on a stack pointer switch.

The cap value is designed to be distinguishable from any procedure return values, which means that when switching stacks we can be confident we are only switching to the top of an incoming GCS. For example, the lower address bits of the cap value may be set to a non-zero bit-pattern which cannot be specified by any valid instruction address, because an instruction alignment requirement may require that all valid instruction addresses are aligned to an address boundary at granularity of the instruction length (e.g. for 32-bit instruction encodings, aligned address boundaries may be at 4-byte intervals). This means that any valid procedure return value should have 0s for the lower bits, and so the cap value is distinguishable by having at least one 1 in the lower bits.

The cap value also contains an address of the location of the cap which we check when switching to the GCS. This address provides:

1) A sanity check that we are returning to the intended GCS using the correct VA to PA mapping of the GCS, by comparing the address of the cap with the value loaded from the cap.
2) A security check in case the cap is (incorrectly) used as part of a procedure return. If we try to branch to the value held in the cap, this is implicitly a *data address because it is in a GCS region (so the check shown in FIG. 6 will trigger a fault if there is an attempt to execute an instruction at that address), and when the processor attempts to execute from this location it will not have execute permissions and will take an exception.

We observe that the security check in point 2 above continues to hold if the address held in the cap is in the same page of memory as the location of the cap, since the address will still be of a *data* page (the GCS memory region, which is set using memory attributes specified directly or indirectly by page table entries defined at granularity of pages of memory address space). This allows us to store fewer bits of the address, if we only store bits [63:12] of the location of the cap, since this ensures we are in the same 4 KB page as the cap location. Therefore an attempt to use the cap as a return address will still cause a permission fault.

Sanity check #1 is also preserved in part, in that we are sure we are switching to the same GCS as intended, although only to a location within the same GCS (but in any case, it is still not possible to validly switch to a location in that GCS that was not the top of the stack when that GCS was previously switched out, because switching to a location not at the top of the stack will cause information other than the valid cap value to be returned, causing an invalid stack cap validity check and therefore an error handling response to be performed).

Therefore, the cap value only needs to specify the page address, and does not need to specify sub-page address bits. On checking the validity of the cap value when switching to an incoming stack, the sub-page address bits of the incoming stack pointer do not need to be checked to detect whether the cap value is valid.

This is useful because it allows the format of the records in the GCS to have more reserved bits, allowing for future expansion of the architecture. This is very useful because it is expected that the GCS could be used to protect a wide range of other information other than function/exception return state information, and so having encoding space to encode other record types can be useful.

Figure 7:
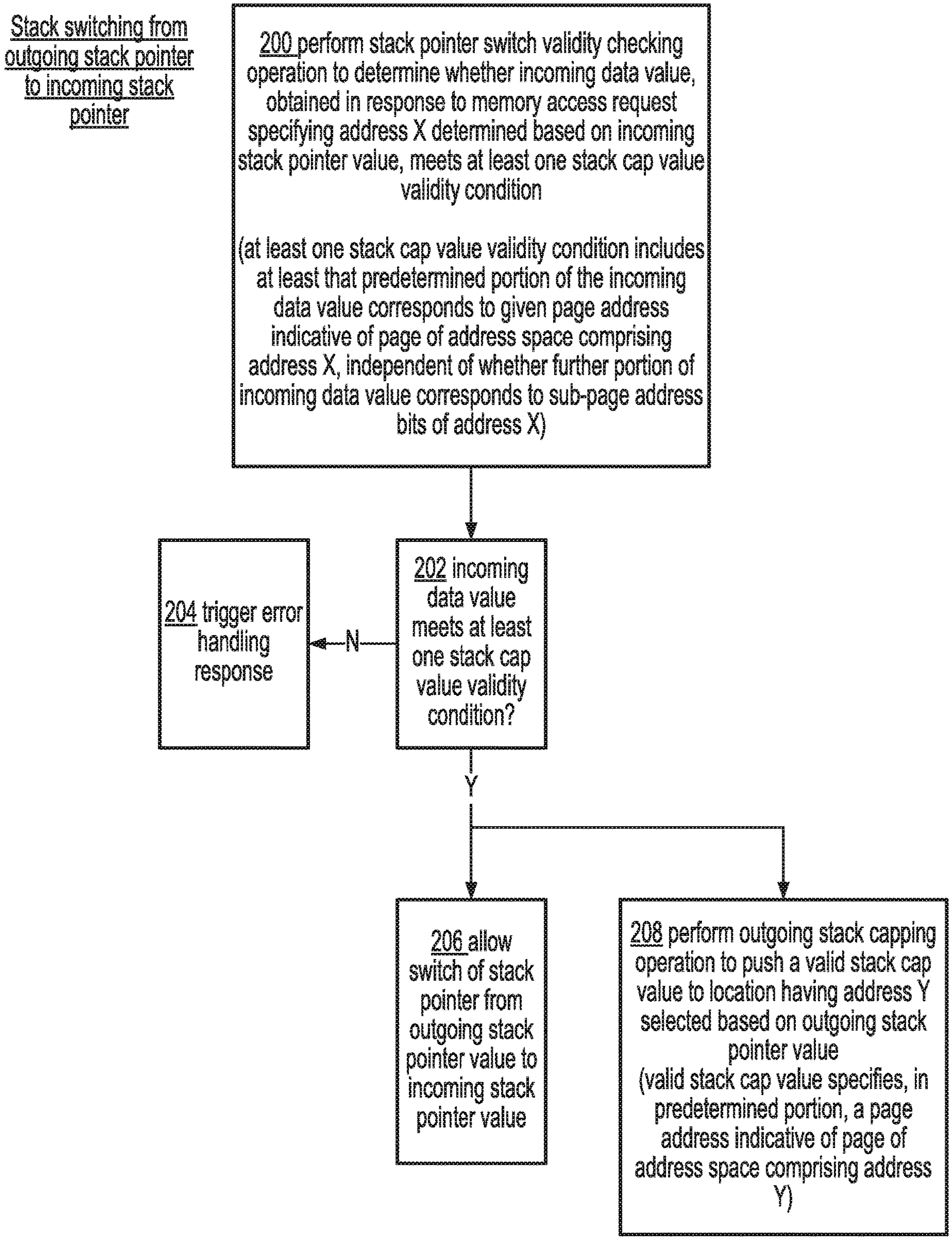
FIG. 7 illustrates a method of controlling stack switching to switch a stack pointer from an outgoing stack pointer value to an incoming stack pointer value.

FIG. 7 illustrates steps performed when switching the stack pointer in GCSPR 36 from an outgoing stack pointer value to an incoming stack pointer value (where the incoming stack pointer value is independent of the outgoing stack pointer value, i.e. this is not a mere increment or decrement of the current stack pointer performed when pushing or popping to or from the stack, but is an arbitrary switch of the stack pointer to specify an address provided as an operand of the instruction which triggers the switch).

At step 200, the processing circuitry 16 performs a stack pointer switch validity checking operation. This includes issuing a memory access request to load an incoming data value from an address X determined based on the incoming stack pointer value. In many cases, the address X can be the address indicated by the incoming stack pointer value itself. However, it would also be possible for the address X of the incoming data value to be determined by applying an offset to the address indicated by the incoming stack pointer value, depending on the way in which the location marking the "top" of the stack is represented relative to the stack pointer value in register 36. The memory access request for loading the incoming data value from address X is a GCS load access so may fail if the address X does not correspond to GCS memory.

If the software has functioned correctly, it is expected that the incoming data value obtained from address X based on the incoming stack pointer value should be the stack cap value which would previously have been placed on the incoming GCS structure when switching away from that GCS structure on a previous switch of the GCS pointer. However, the processing circuitry 16 does not (yet) know whether the incoming stack pointer value actually corresponds to the previously accessed GCS structure, so it is also possible that the incoming data value may not correspond to the valid stack cap value.

Hence, at step 200 the processing circuitry 16 performs the stack pointer switch validity checking operation, to check whether the incoming data value meets at least one stack cap value validity condition. The at least one stack cap value validity condition includes at least that a predetermined portion of the incoming data value corresponds to a given page address indicating a page of address space comprising address X, independent of whether a further portion of the incoming data value corresponds to sub-page address bits of address X. More particularly, the predetermined portion of the incoming data value is required to corresponds to a virtual page address corresponding to virtual address X, so that this check can check whether the virtual-to-physical address mapping used to access the stack based on the incoming stack pointer value is still the same as previously when the stack was accessed. By not considering sub-page address bits of address X for verifying the at least one stack cap value validity condition, this frees up a significant amount of encoding space in GCS stack records for other purposes, as will be discussed below in more detail with respect to FIG. 11. As shown in step 224 of FIG. 8 discussed below, the at least one stack cap value validity condition may also impose other requirements on the encoding of the incoming data value.

At step 202 it is determined whether the incoming data value meets each of the at least one stack cap value validity condition being applied by the processing circuitry 16. The at least one stack cap value validity condition required to be satisfied includes at least that the incoming data value specifies the virtual page address of the location storing the incoming data value. One or more additional stack value validity conditions could also be applied (e.g. that the lower portion of the incoming data value is a token bit pattern representing a stack cap value). If any stack cap value validity condition is not met, then at step 204 an error handling response is triggered. For example, this response could be signalling a fault, setting an error flag in an error reporting register, or setting the stack pointer in GCSPR 36 to an invalid address in a reserved address range which cannot be specified for any valid memory address (the MMU may trigger a fault if there is any attempt to perform a load/store operation or an instruction fetch for an address in the reserved range).

If it is determined that the incoming data value does meet each of the at least one stack cap value validity condition being applied, then at step 206 the processing circuitry 16 allows the switch of stack pointer from the outgoing stack pointer value to the incoming stack pointer value (so the incoming stack pointer value is written to GCSPR 36).

Also, at step 208 the processing circuitry 16 performs an outgoing stack capping operation to push a valid stack cap value to a location having an address Y selected based on the outgoing stack pointer value. The valid stack cap value specifies, in the predetermined portion that would be checked at step 200, a (virtual) page address indicating a page of address space comprising (virtual) address Y). Hence, this ensures that the outgoing stack is sealed (to prevent returns being triggered based on access to the top of that stack, since the stack cap value has a value which would cause a fault on an instruction fetch or branch to that address), and has the appropriate cap value which will later allow a valid switch back to that stack when the corresponding stack pointer value is specified as the incoming stack pointer for a stack switch.

In some implementations, the outgoing stack capping operation shown in FIG. 7 may be performed in response to the same instruction that also triggers a stack pointer switch validity checking operation.

Figure 8:
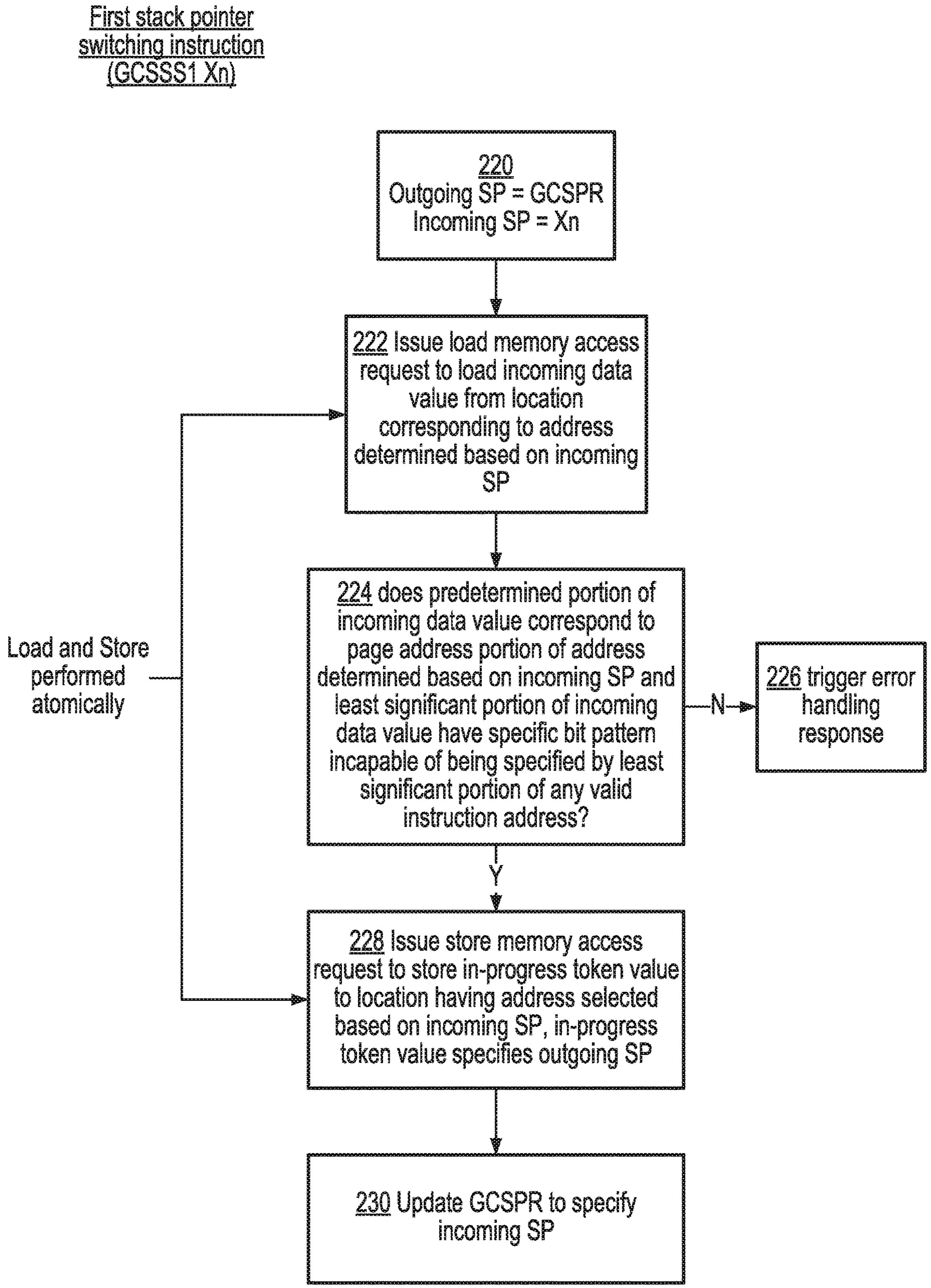
FIG. 8 illustrates processing of a first stack pointer switching instruction.
Figure 9:
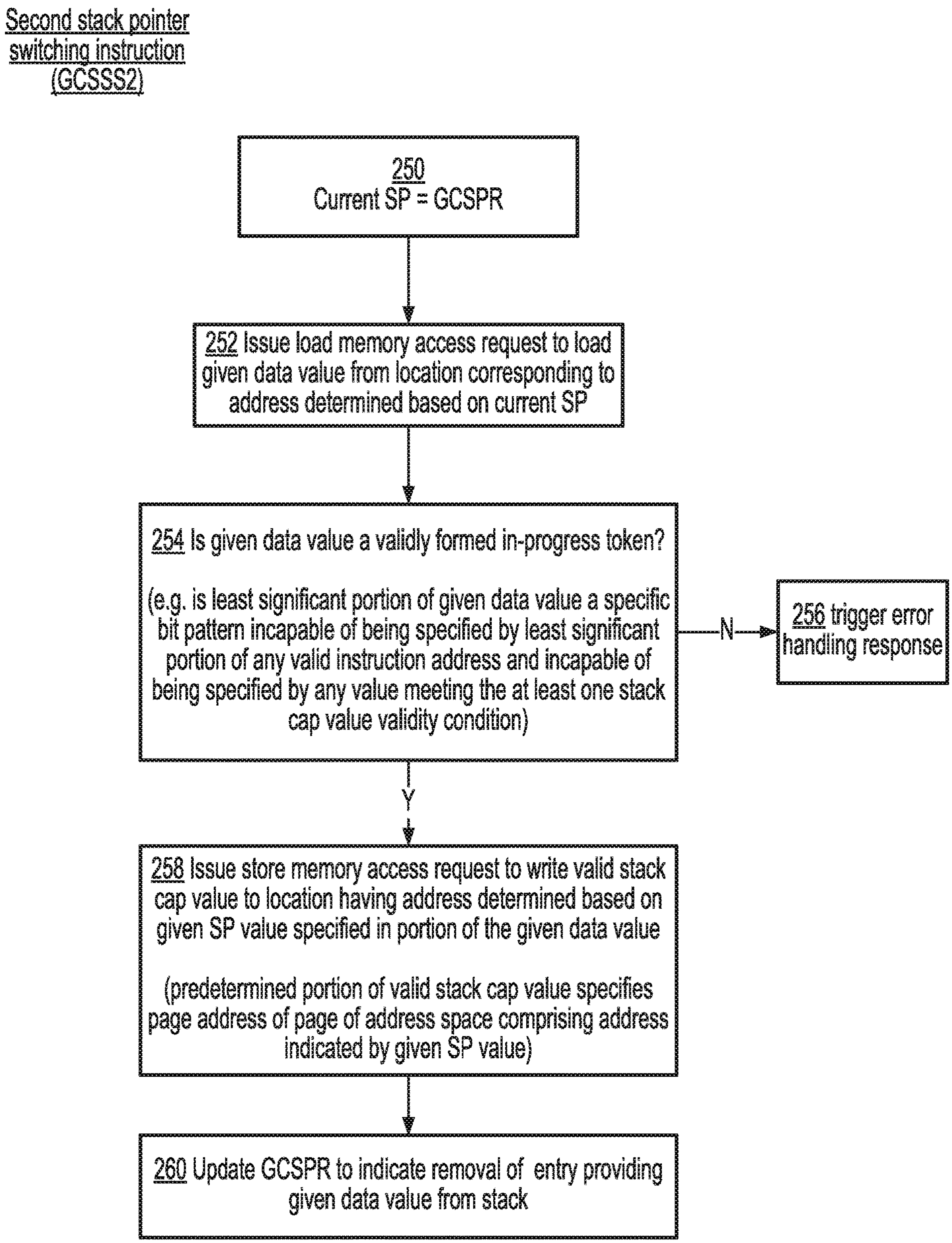
FIG. 9 illustrates processing of a second stack pointer switching instruction.

However, FIGS. 8 and 9 show a specific example where the outgoing stack capping operation is performed in response to a different instruction to the instruction triggering the stack pointer switch validity checking operation. Splitting these operations into separate instructions can greatly simplify circuit implementation because it avoids the need for two different memory addresses to be translated by the MMU 28 in the same instruction. FIG. 8 shows a function of a first stack pointer switching instruction (GCSSS1) used to perform the stack pointer switch validity checking operation and to implement the switch of stack pointer in GCSPR 36. FIG. 9 shows a function of a second stack pointer switching instruction (GCSSS2) used to perform the outgoing stack capping operation.

As shown in step 220 of FIG. 8, the operands for the first stack pointer switching instruction are the outgoing stack pointer value specified in the GCSPR 36 and an incoming stack pointer value specified in a general purpose register Xn whose register specifier is encoded within the instruction encoding of the first stack pointer switching instruction. Hence, software can select an arbitrary general purpose register for defining the incoming stack pointer, and earlier instructions may set that incoming stack pointer in any arbitrary software-specific manner. The GCSPR 36 does not need to be explicitly encoded in the encoding of the GCSSS1 instruction because it is an implicit operand of the operation.

In response to the GCSSS1 instruction being decoded by the decode stage 10 and issued for execution by the issue stage 12 of the pipeline 4, at step 222 the processing circuitry 16 controls the memory access circuitry (load/store unit 26) to issue a load memory access request requesting loading of the incoming data value from a location corresponding to an address determined based on incoming stack pointer value (derived from register Xn). In one particular implementation, the address specified by the load memory access request is equal to the incoming stack pointer value, but other examples could derive the address of the load by applying an offset to the incoming stack pointer value. This load memory access request is subject to the checks shown in FIG. 4, as it is an GCS load operation because it was triggered by the GCSSS1 instruction. Assuming the load operation passes these checks, the incoming data value is returned and at step 224 the processing circuitry 16 checks whether (i) the predetermined portion of the incoming data value corresponds to the page address portion of the virtual address used for the load at step 222, and (ii) the least significant portion of the incoming data value is a specific bit pattern identifying a valid stack cap value, which is incapable of being specified by the least significant portion of any valid instruction address. If either of these checks fails then the incoming data value is not a valid stack cap value and at step 226 an error handling response is triggered (which could be of any of the types of error handling response mentioned above for step 204 of FIG. 7).

If the checks at step 224 are passed (the predetermined portion of the incoming data value corresponds to the page address portion of the virtual address used for the load at step 222, and the least significant portion of the incoming data value has the specific bit pattern identifying a valid stack cap value), i.e. the incoming data value meets the at least one stack cap value validity condition, then at step 228 the processing circuitry 16 controls the memory access circuitry 26 to issue a store memory access request to store an in-progress token value to the memory location having the address selected based on the incoming stack pointer. The in-progress token value specifies the outgoing stack pointer value and has its least significant portion set to another bit pattern incapable of being specified by the least significant portion of any valid instruction address, which differs from the encoding of the least significant portion of a valid stack cap value. One might not expect that it is necessary for the instruction which switches stack pointers to use the outgoing stack pointer as an operand, since one would expect it is possible simply to overwrite the outgoing stack pointer with the incoming stack pointer value in GCSPR 36. However, by writing the outgoing stack pointer to the incoming stack (after the incoming stack has been verified by performing the stack cap value validity check of step 224), this helps support an implementation where the stack pointer switching operations are split between two instructions GCSSS1, GCSSS2, as it enables the outgoing stack pointer value to be retained so that it is available to the second stack pointer switching instruction GCSSS2, without needing an architectural register to be consumed for retaining the outgoing stack pointer value after it is overwritten in the GCSPR 36.

At step 230, in the case when the checks at step 224 are passed, the GCSPR 36 is updated to specify the incoming stack pointer value (so the outgoing stack pointer value is overwritten).

As shown in FIG. 8, the load at step 222 and the store at step 228 are performed atomically, so that the result seen by the software executing the GCSSS1 instruction and another thread accessing the same address determined based on incoming stack pointer is consistent with the result that would occur if the load at step 222 and store at step 228 are performed in succession without any intervening write to that address occurring between the load at step 222 and the store at step 228. There may be a number of different techniques which can be used to ensure this atomicity. For example, a lock-based approach could be used to lock access to the relevant memory location so that no other writes to that memory location can be permitted in the period between the load and the store. Alternatively, conflicting write operations triggered by other threads (e.g. executing on a different processor core) could still be permitted in the intervening period, but a mechanism may be provided to detect such conflicting write operations and abort the processing performed by the stack pointer switching instruction if such a write is detected (e.g. flushing the pipeline and rewinding to an earlier point of execution in the thread that includes the GCSSS1 instruction, to cause the GCSSS1 instruction to be re-executed later). The atomic processing of the load and store helps to improve security by reducing the chance that the state checked by the GCSSS1 instruction changes before the check is complete, which could risk errors.

FIG. 9 illustrates processing of the second stack pointer switching instruction (GCSSS2). As shown at step 250, the operand for the instruction is the current value specified in the GCSPR 36. It is expected that, in the common use case where the GCSSS2 instruction follows the GCSSS1 instruction, the value in the GCSPR 36 should be the incoming stack pointer value which was specified based on the Xn operand of the GCSSS1 instruction. However, in practice the hardware of the processor has no way of checking that the GCSSS2 instruction actually followed the GCSSS1 instruction, so while the pseudocode for GCSSS2 below refers to the operand of the GCSSS2 instruction as the "incoming" stack pointer value, more generally it operates on the current stack pointer stored in the stack pointer register 36, without regard to whether this is actually the same value as the incoming stack pointer value for an earlier GCSSS1 instruction.

In response to the GCSSS2 instruction being decoded by the decode stage 10 and issued for execution by the issue stage 12 of the pipeline 4, at step 252 the processing circuitry 16 controls the memory access circuitry 26 to issue a load memory access request requesting loading of a given data value from a location corresponding to an address determined based on the current stack pointer obtained from GCSPR 36. In one particular implementation, the address specified by the load memory access request is equal to the current stack pointer value from GCSPR 36, but other examples could derive the address of the load by applying an offset to the current stack pointer value. This load memory access request is subject to the checks shown in FIG. 4, as it is an GCS load operation because it was triggered by the GCSSS2 instruction. Assuming the load operation passes these checks, the given data value is returned and at step 254 the processing circuitry 16 checks whether the given data value is a validly formed in-progress token. For example, the processing circuitry 16 determines that the given data value is a validly formed in-progress token when a least significant bit portion of the given data value matches a specific bit pattern used to encode in-progress tokens. This bit pattern is different to the bit pattern at the least significant portion of a valid stack cap value, so is incapable of being specified by any value meeting the at least one stack cap value validity condition. Also, this bit pattern is incapable of being specified by any valid instruction address (e.g. as it is non-zero in the lower bit positions which are less significant than the bit representing the significance of the instruction alignment boundary). If the given data value is not a validly formed in-progress token, then at step 256 an error handling response is triggered (again this can be any of the error handling response types mentioned earlier).

If the given data value is a validly formed in-progress token, then at step 258 the processing circuitry 16 controls the memory access circuitry 26 to issue a store memory access request to write a valid stack cap value to a location having an address Y determined based on a given stack pointer value specified in the portion of the given data value loaded at step 252. In some examples, address Y may be offset relative to the given stack pointer value by an amount corresponding to the size of one stack entry, to reflect that the addition of the valid stack cap value onto the top of the stack means the stack pointer of the corresponding stack would be incremented/decremented from its previous value (represented by the given stack pointer value) similar to any other stack push operation to push a new stack entry to the stack. Hence, the store operation at step 258 is to a different address Y than the address from which the given data value was loaded at step 252. If the GCSSS2 instruction does follow an earlier GCSSS1 instruction, the store at step 258 is to the outgoing stack structure based on the outgoing stack pointer for the GCSSS1 instruction, while the load at step 252 is from the incoming stack structure. The valid stack cap value specifies, within the predetermined portion which is checked for the page address at step 224 of FIG. 8, a (virtual) page address of the page of address space comprising the virtual address Y which is indicated by the given stack pointer value obtained from the given data value loaded at step 252. This sets up the stack cap value on the outgoing stack so that on a later switch of stack pointer back to the outgoing stack (now acting as the incoming stack), the check performed at step 224 of FIG. 8 for a GCSSS1 instruction can be passed for that later stack pointer switch.

Also, at step 260 of FIG. 9, the processing circuitry, in response to the GCSSS2 instruction, updates the stack pointer in the GCSPR 36 to indicate removal from the stack of the entry which provided the given data value. This update may be either an increment or decrement of the current stack pointer by an amount corresponding to the size of one stack record. Whether an increment or decrement is applied depends on whether the stack is managed as a descending stack or an ascending stack (both options are possible—for a descending stack the stack pointer is decremented on a push and incremented on a pop, and vice versa for an ascending stack).

Example pseudocode for representing the functionality of the GCSSS1 and GCSSS2 instructions is shown below. It will be appreciated that although this is shown as pseudocode, in a hardware processor it will be implemented using hardware circuit logic gates implementing the corresponding functions.

```
gcsss1(bits(64) Xn)
bits(64) outgoing_pointer, incoming_pointer, incoming_value,
   in_progress_entry;
outgoing_pointer = GCSPR;
incoming_pointer = Xn;
incoming_value = mem[incoming_pointer];
if incoming_value == incoming_pointer[63:12]:'000000000001' then
         // valid entry, as incoming value is a validly formed stack cap
         //value
   in_progress_entry = outgoing_pointer[63:3]:'101'; // in_progress_token
   mem[incoming_pointer] = in_progress_entry; // atomic with earlier load
   GCSPR = incoming_pointer[63:3]:'000'; //switch GCS pointer
else
   assert(FALSE); // take error handling response
```

-continued

```
gcsss2( )
bits(64) outgoing_pointer, incoming_pointer, outgoing_value;
incoming_pointer = GCSPR;
outgoing_value = mem[incoming_pointer];
if outgoing_value[2:0] == '101' then   // valid in_progress token
   outgoing_pointer[63:0] = (UInt(outgoing_value[63:3]:'000') - 8)<63:0>;
   outgoing_value = outgoing_pointer[63:12]:'000000000001';
      // set up valid entry on outgoing stack, including the stack cap value
   mem[outgoing_pointer] = outgoing_value;
   GCSPR = incoming_pointer + 8;
   // nudge the incoming GCS up one data word, to represent removal of
   //in-progress token
   return outgoing_pointer;
else
   assert(FALSE); // take error handling response.
```

Of course, the particular encodings used for the valid stack cap value and in progress token can vary from those shown in the pseudocode.

Figure 10:
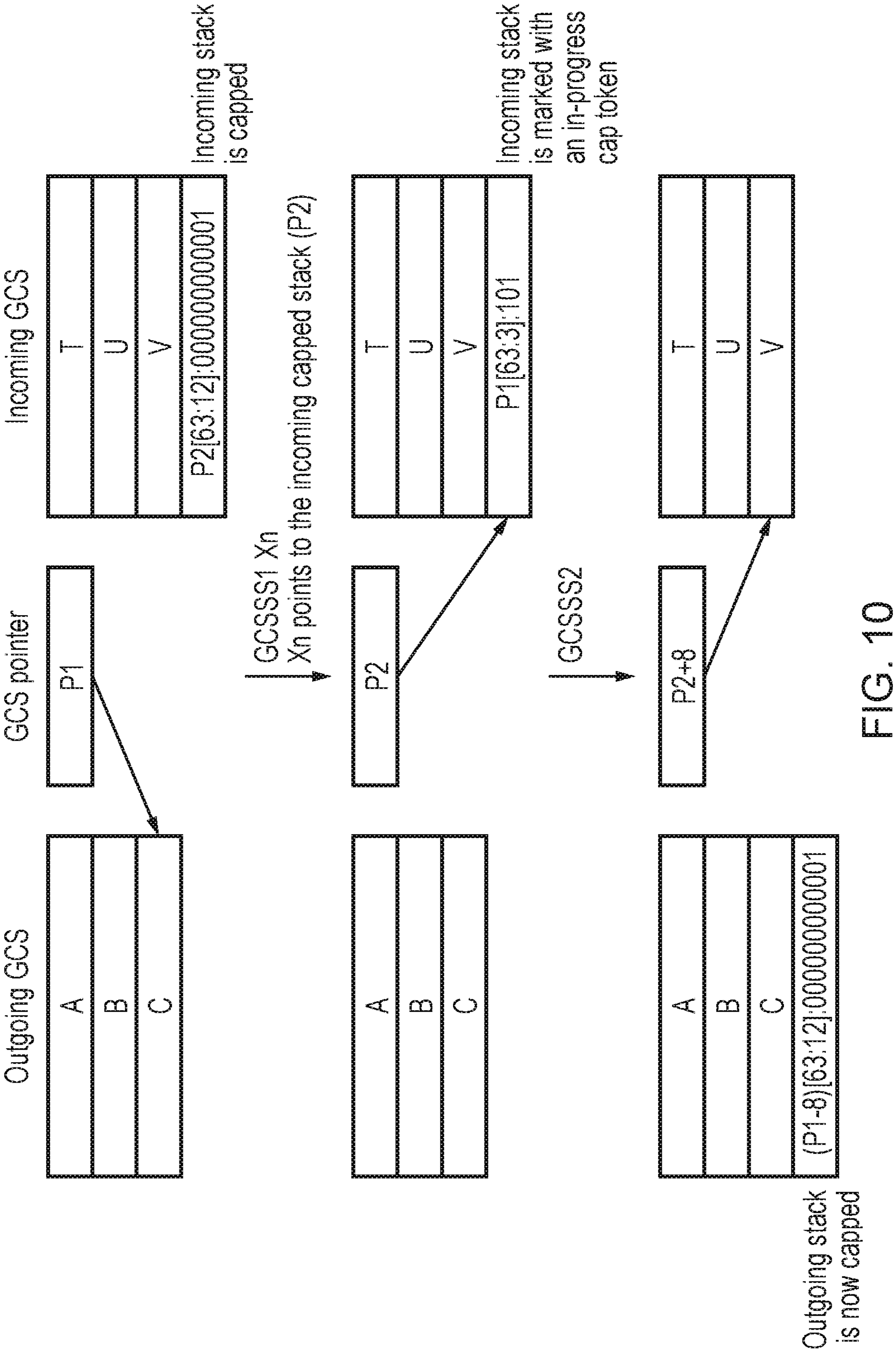
FIG. 10 illustrates stack pointer switching.

FIG. 10 schematically illustrates an example of stack switching based on the operations discussed above. The top part of FIG. 10 shows the initial state when the outgoing GCS pointer P1 in GCSPR 36 currently points to the top of the outgoing GCS, and an incoming GCS (associated with a pointer P2) has previously been capped by storing the valid stack cap value at the top of the stack.

As shown in the middle part of FIG. 10, when the GCSSS1 instruction is executed specifying an operand indicating the pointer P2 to the incoming GCS, the stack pointer switch validity checking operation is passed because the page address portion P2 of the incoming stack pointer value matches the predetermined portion P2 [63:12] of the value obtained from the location on the incoming GCS corresponding to the incoming stack pointer value. Therefore, the incoming stack is marked with the in-progress token value specifying the outgoing stack pointer P1 [63:3] and the GCSPR 36 is updated to indicate the incoming stack pointer value P2.

As shown in the lower part of FIG. 10, when the GCSSS2 instruction is executed, the in-progress token on the incoming GCS (accessed based on the current stack pointer value P2 in the GCSPR 36) is verified and it passes the check, and therefore the outgoing stack is capped by writing, to a location on the outgoing stack addressed based on the outgoing stack pointer P1 [63:3] obtained from the in-progress cap token, the valid stack cap value which specifies the page address portion of the page comprising the location written with the valid stack cap value. Also, the current stack pointer in GCSPR 36 is updated, to represents removal of the in-progress token from the incoming GCS (in this example by adding 8, but other examples could use a decrement or could have different sized stack records and so a different increment/decrement size).

Figure 11:
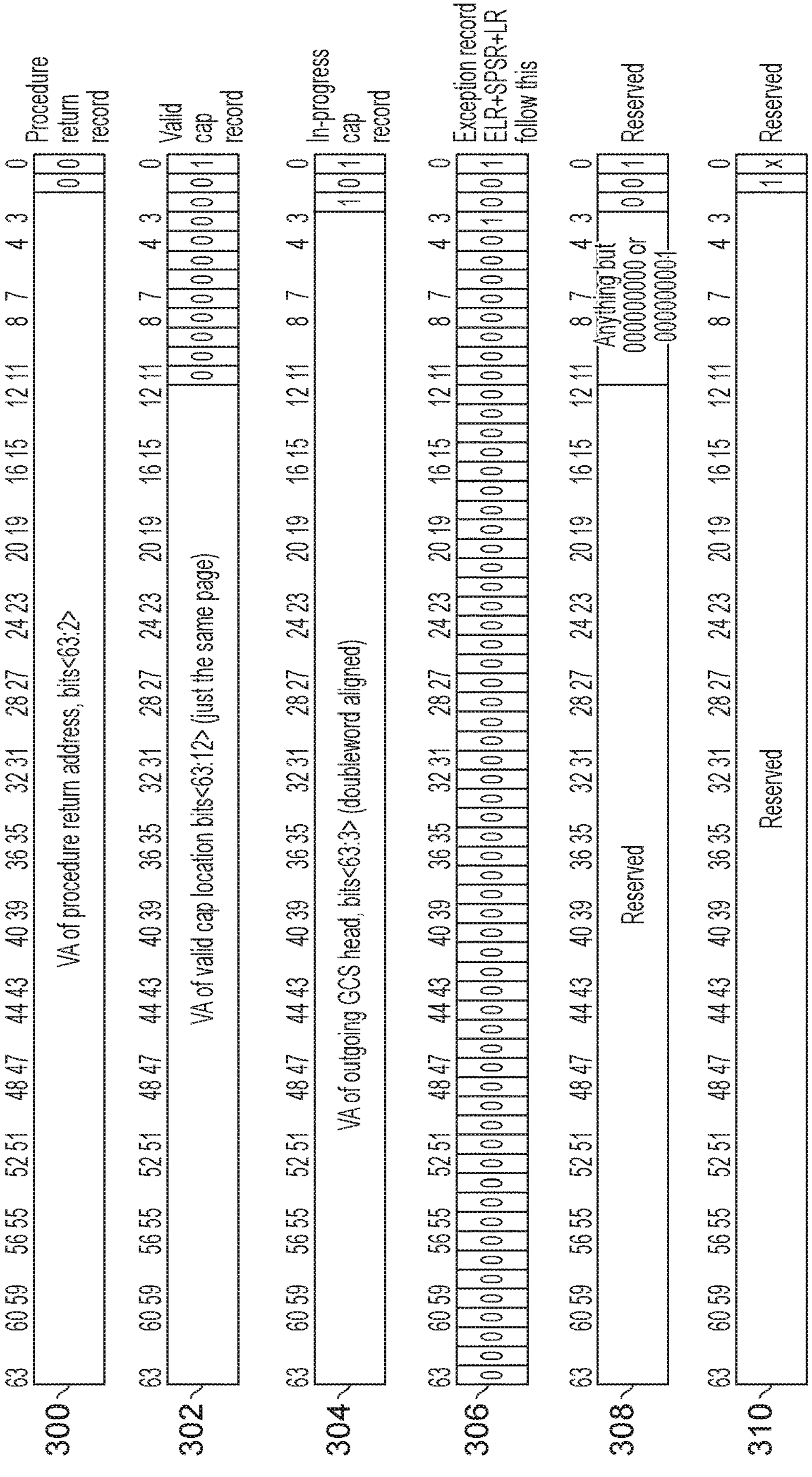
FIG. 11 illustrates example encodings for GCS records.

FIG. 11 illustrates examples of different formats of GCS records that can be placed on the GCS stack:

- a procedure (function) return address record 300, providing 62 bits of procedure return address. The lower 2 bits of 0b00 signify that this is a procedure return record (since these bits are 0, the address is 4-byte aligned and so can be a valid instruction address for 32-bit instruction encodings aligned to an address boundary).
- a stack cap value record 302, providing 52 bits of the page address, and having a value of 0b000000000001 for the lower 12 bits. As the lower bits are 0b01, this would be an unaligned address if interpreted as an instruction address, so would trigger an unalignment fault.
- an in-progress token record 304, providing 61 bits of a stack pointer value (used to represent the outgoing stack pointer during the stack pointer switch as mentioned above—with this encoding there is a requirement for this outgoing stack pointer to be doubleword aligned, so that the 62$^{nd}$ bit of the stack pointer address is implicitly 0). The lower 3 bits of the record 304 have an encoding 0b101 to signify that this is an in-progress token.
- an exception record 306, which has the lower 5 bits set to 0b01001 and all more significant bits are 0. When an exception record 306 is detected on the stack, a defined number of following records (for which the full 64 bits are available for recording exception state information) provide items of exception return state, e.g. an exception return address, saved processor state associated with the processing being returned to, etc.

This encoding means that there are a number of reserved encodings left spare, available for future expansion:

- encodings 308 having the lower 3 bits set to 0b001 (the same as the stack cap record 302 and exception record 306), but which have the next 9 bits set to anything other than 0b000000000 or 0b000000001. These encodings allow encoding of at least 29-2=510 additional record types (by setting different "record type" indicators in bits [11:3]), each supporting recording of other types of information in the remaining 52 bits at bits [63:12] of the record. This additional encoding space is freed up as a consequence of the stack cap value record 302 specifying a page address instead of a full address.
- encodings 310 having the lower 2 bits [1:0] set to 0b10 or 0b11, which support a full 62-bit value being specified in the remaining bits [63:2].

Figure 12:
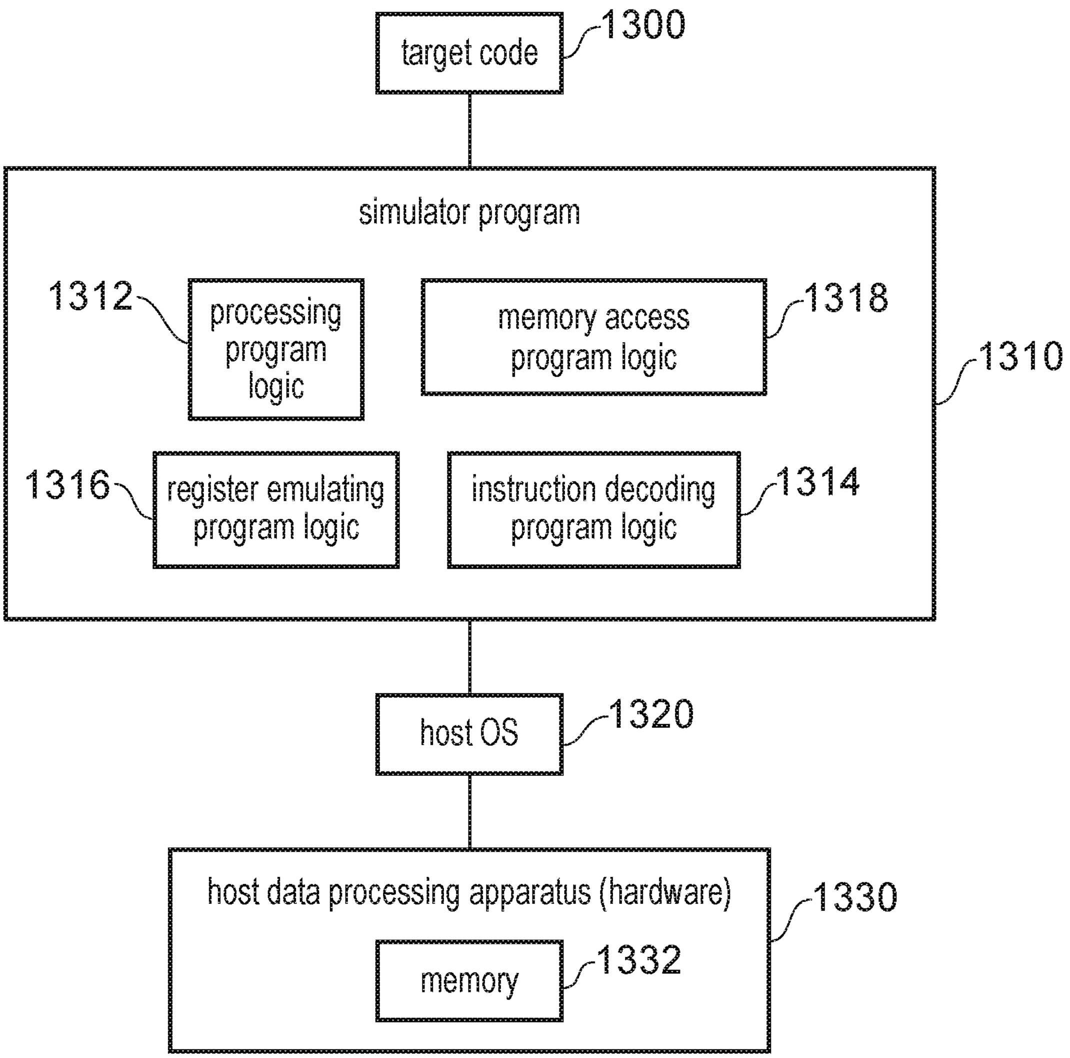
FIG. 12 illustrates a simulation example.

FIG. 12 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 1330, optionally running a host operating system 1320, supporting the simulator program 1310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 1330), some simulated embodiments may make use of the host hardware, where suitable.

The simulator program 1310 may be stored on a computer-readable storage medium (which may be a non-transitory medium), and provides a program interface (instruction execution environment) to the target code 1300 (which may include applications, operating systems and a hypervisor) which is the same as the interface of the hardware architecture being modelled by the simulator program 1310. Thus, the program instructions of the target code 1300, including the stack pointer switching instructions GCSSS1, GCSSS2 described above, may be executed from within the instruction execution environment using the simulator program 1310, so that a host computer 1330 which does not actually have the hardware features of the apparatus 2 discussed above can emulate these features. Similarly, the various memory management checking functions and triggering of accesses to memory as discussed above for the MMU 28 and load/store unit 26, including support for GCS memory region type, may be emulated using memory access program logic 1318 of the simulator program 1310.

Hence, the simulator program 1310 may have processing program logic 1312 which simulates the state of the processing circuitry 4 described above. For example the processing program logic 1312 may simulate transitions of execution state in response to events occurring during simulated execution of the target code 1300, and perform processing operations. Instruction decoding program logic 1314 (which can be considered a part of the processing program logic) decodes instructions of the target code 1300 and maps these to corresponding sets of instructions in the native instruction set of the host apparatus 1330. Register emulating program logic 1316 maps register accesses requested by the target code to accesses to corresponding data structures maintained on the host hardware of the host apparatus 1330, such as by accessing data in registers or memory 1332 of the host apparatus 1330 (e.g. accesses to a host location representing a simulated GCS pointer register can be managed by the register emulating program logic 1316 when an instruction, such as a GCS push/pop instruction or the GCSSS1, GCSSS2 instructions, is executed that requires access to the GCS pointer register). Memory access program logic 1318 implements address translation, page table walks and access control checking in a corresponding way to the MMU 28 described in the hardware-implemented embodiment above, but also has the additional function of mapping the simulated physical addresses, obtained by the address translation based on the page tables defined for the target code 1300, to host virtual addresses used to access host memory 1332. These host virtual addresses may themselves be translated into host physical addresses using the standard address translation mechanisms supported by the host (the translation of host virtual addresses to host physical addresses being outside the scope of what is controlled by the simulator program 1310).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: [A], [B] and [C]" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:

memory access circuitry to perform a stack access to a stack data structure based on a stack pointer; and processing circuitry to perform a stack pointer switch validity checking operation associated with a switch of the stack pointer from an outgoing stack pointer value to an incoming stack pointer value, the stack pointer switch validity checking operation comprising verifying whether an incoming data value obtained by the memory access circuitry in response to a memory access request specifying an address determined based on the incoming stack pointer value meets at least one stack cap value validity condition, the at least one stack cap value validity condition including a condition that a predetermined portion of the incoming data value corresponds to a given page address indicative of a page of address space comprising the address determined based on the incoming stack pointer value, in which:

the processing circuitry is configured to determine whether the incoming data value meets the at least one stack cap value validity condition, independent of whether a further portion of the incoming data value other than the predetermined portion corresponds to sub-page address bits of the address determined based on the incoming stack pointer value; and the processing circuitry is configured to trigger an error handling response in response to determining that the incoming data value fails to meet the at least one stack cap value validity condition.

2. The apparatus according to claim 1, in which the given page address is a virtual page address indicative of a page of virtual address space comprising a virtual address determined based on the incoming stack pointer value.

3. The apparatus according to claim 1, in which the processing circuitry is configured to perform an outgoing stack capping operation associated with the switch of the stack pointer from the outgoing stack pointer value to the incoming stack pointer value, to push a valid stack cap value to a location having an address selected based on the outgoing stack pointer value, the valid stack cap value specifying, in the predetermined portion of the valid stack cap value, a page address indicative of a page of address space comprising the address selected based on the outgoing stack pointer value.

4. The apparatus according to claim 3, in which the page address specified in the valid stack cap value is a virtual page address indicative of a page of virtual address space comprising a virtual address selected based on the outgoing stack pointer value.

5. The apparatus according to claim 1, in which the stack pointer is a guarded control stack (GCS) pointer for controlling access to a guarded control stack (GCS) data structure for protecting return addresses for returning from an exception or function call.

6. The apparatus according to claim 5, comprising memory management circuitry to determine whether access to a target address is allowed based on memory attribute data associated with the target address, the memory attribute data specifying whether a target memory address space region including the target address is a GCS region for storing the GCS data structure, where write access to the GCS region is restricted to a dedicated class of GCS accessing instructions.

7. The apparatus according to claim 6, in which the memory management circuitry is configured to reject an instruction fetch or branch to the target address when the memory attribute data specifies that the target memory address space region is the GCS region.

8. The apparatus according to claim 6, in which the memory management circuitry is configured to reject a non-GCS store operation to the target address triggered by a store instruction other than the dedicated class of GCS accessing instructions, in response to determining that the target memory address space region is the GCS region.

9. The apparatus according to claim 6, in which the memory management circuitry is configured to reject a GCS load/store operation to the target address triggered by one of the dedicated class of GCS accessing instructions, in response to determining that the target memory address space region is not the GCS region.

10. The apparatus according to claim 1, in which the at least one stack cap value validity condition also comprises a condition that a least significant portion of the incoming data value has a bit pattern incapable of being specified by the least significant portion of any valid instruction address.

11. The apparatus according to claim 1, in which the processing circuitry is configured to perform the stack pointer switch validity checking operation in response to a first stack pointer switching instruction specifying an operand indicating the incoming stack pointer value.

12. The apparatus according to claim 11, comprising a stack pointer register to store the stack pointer; in which:

in response to the first stack pointer switching instruction, when the stack pointer switch validity checking operation is successful, the processing circuitry is configured to update the stack pointer register from the outgoing stack pointer value to the incoming stack pointer value.

13. The apparatus according to claim 12, in which in response to the first stack pointer switching instruction, the processing circuitry is configured to push, to a location having an address selected based on the incoming stack pointer value, an in-progress token value specifying the outgoing stack pointer value.

14. The apparatus according to claim 13, in which, for a load operation to load the incoming data value to be verified in the stack pointer switch validity checking operation and a store operation to push the in-progress token value to the location having the address selected based on the incoming stack pointer value, the processing circuitry is configured to perform the load operation and the store operation atomically.

15. The apparatus according to claim 13, in which in response to a second stack pointer switching instruction, the processing circuitry is configured to:

verify whether a given data value, obtained by the memory access circuitry in response to a memory access request specifying an address determined based on a current stack pointer in the stack pointer register, is a validly formed in-progress token value; and in response to verifying that the given data value is a validly formed in-progress token value:

trigger a write, to a location having an address determined based on a given stack pointer value specified by a portion of the given data value, a valid stack cap value specifying, in the predetermined portion of the valid stack cap value, a page address indicative of a page of address space comprising an address determined based on the given stack pointer value.

16. The apparatus according to claim 15, in which in response to the second stack pointer switching instruction when the given data value is verified as being the validly formed in-progress token value, the processing circuitry is configured to update the current stack pointer in the stack pointer register to indicate removal of an entry providing the given data value from a corresponding stack data structure.

17. The apparatus according to claim 15, in which the processing circuitry is configured to verify that the given data value is the validly formed in-progress token value when a least significant portion of the given data value has a bit pattern incapable of being specified by the least significant portion of any valid instruction address and incapable of being specified by any value meeting the at least one stack cap value validity condition.

18. The apparatus according to claim 15, in which the processing circuitry is configured to trigger an error handling response in response to determining that the given data value is not a validly formed in-progress token value.

19. The apparatus according to claim 1, in which the error handling response comprises at least one of:

signalling a fault;

setting an error reporting indication; and setting the stack pointer to an invalid value.

20. A method comprising:

performing a stack pointer switch validity checking operation associated with a switch of a stack pointer from an outgoing stack pointer value to an incoming stack pointer value, the stack pointer switch validity checking operation comprising verifying whether an incoming data value obtained by memory access circuitry in response to a memory access request specifying an address determined based on the incoming stack pointer value meets at least one stack cap value validity condition, the at least one stack cap value validity condition including a condition that a predetermined portion of the incoming data value corresponds to a given page address indicative of a page of address space comprising the address determined based on the incoming stack pointer value, in which:

whether the incoming data value meets the at least one stack cap value validity condition is determined independent of whether a further portion of the incoming data value other than the predetermined portion corresponds to sub-page address bits of the address determined based on the incoming stack pointer value; and the method comprises triggering an error handling response in response to determining that the incoming data value fails to meet the at least one stack cap value validity condition.

21. A non-transitory storage medium storing a computer program comprising instructions which, when executed by a host data processing apparatus, control the host data processing apparatus to provide an instruction execution environment for executing target code, the computer program comprising:

memory access program logic to perform a stack access to a stack data structure based on a stack pointer; and processing program logic to perform a stack pointer switch validity checking operation associated with a switch of the stack pointer from an outgoing stack pointer value to an incoming stack pointer value, the stack pointer switch validity checking operation comprising verifying whether an incoming data value obtained by the memory access program logic in response to a request specifying an address determined based on the incoming stack pointer value meets at least one stack cap value validity condition, the at least one stack cap value validity condition including a condition that a predetermined portion of the incoming data value corresponds to a given page address indicative of a page of address space comprising the address determined based on the incoming stack pointer value, in which:

the processing program logic is configured to determine whether the incoming data value meets the at least one stack cap value validity condition, independent of whether a further portion of the incoming data value other than the predetermined portion corresponds to sub-page address bits of the address determined based on the incoming stack pointer value; and the processing program logic is configured to trigger an error handling response in response to determining that the incoming data value fails to meet the at least one stack cap value validity condition.

* * * * *